US006628118B1

(12) United States Patent
Amini

(10) Patent No.: US 6,628,118 B1
(45) Date of Patent: *Sep. 30, 2003

(54) METHOD AND APPARATUS FOR CONTROL OF MAGNETIC FLUX DIRECTION AND CONCENTRATION

(75) Inventor: Bijan K. Amini, Houston, TX (US)

(73) Assignee: EM-Tech Sensors LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/672,755

(22) Filed: Sep. 28, 2000

Related U.S. Application Data

(60) Provisional application No. 60/166,696, filed on Nov. 20, 1999.

(51) Int. Cl.[7] .................... G01N 27/82; G01R 33/12; G01V 3/12
(52) U.S. Cl. ........................... 324/334; 324/239
(58) Field of Search ................. 324/333, 334, 324/335, 337, 338, 339, 343, 228–231, 221, 234–243

(56) References Cited

U.S. PATENT DOCUMENTS

| 3,277,363 A | 10/1966 | Schuster | |
|---|---|---|---|
| 5,038,107 A | 8/1991 | Gianzero | 324/339 |
| 5,065,100 A | 11/1991 | Vail | 324/339 |
| 5,132,623 A | 7/1992 | De | 324/338 |
| 5,260,661 A | 11/1993 | Vail | 324/339 |
| 5,283,520 A | 2/1994 | Martin | 324/220 |
| 5,426,367 A | 6/1995 | Martin | 324/339 |
| 5,610,517 A | 3/1997 | Ma | 324/233 |
| 5,654,639 A | 8/1997 | Locatelli | 324/339 |
| 5,668,475 A | 9/1997 | Orban | 324/339 |
| 5,698,982 A | 12/1997 | Mitchell | 324/339 |
| 5,751,144 A | 5/1998 | Weischedel | 324/240 |
| 5,869,968 A | 2/1999 | Brooks | 324/338 |
| 5,892,361 A | 4/1999 | Meyer | 324/338 |
| 5,892,460 A | 4/1999 | Jerabek | 340/856.4 |
| 5,942,894 A | 8/1999 | Wincheski | 324/220 |
| 5,966,013 A | 10/1999 | Hagiwara | 324/339 |
| 5,969,254 A | 10/1999 | Yamaguchi | 73/602 |
| 6,008,657 A | 12/1999 | Suyama | 324/639 |
| 6,025,721 A | 2/2000 | Vail | 340/572.8 |
| 6,084,403 A | 7/2000 | Sinclair | 324/221 |
| 6,100,696 A | 8/2000 | Sinclair | 324/339 |
| 6,127,823 A | 10/2000 | Atherton | 324/220 |
| 6,157,195 A | 12/2000 | Vail | 324/368 |
| 6,163,155 A | 12/2000 | Bittar | 324/338 |

*Primary Examiner*—N. Le
*Assistant Examiner*—Reena Aurora
(74) *Attorney, Agent, or Firm*—David McEwing

(57) ABSTRACT

The invention subject of this invention pertains to device and methods for transmitting electromagnetic signals into or through magnetically permeable and electrically conductive materials. The invention also teaches the method and apparatus for receiving a return signal from or through the material, thereby permitting information to be collected on matter on the opposite side of the material. The subject invention teaches various techniques for creating EM wave transparencies in materials such as carbon steel and iron. The invention further teaches methods and apparatus for varying, in a controlled manner, the size of the transparency, the creation of multiple transparencies, the sequential opening and closing of the transparencies, utilization of one or more transmitting and receiving devices, each of which may be located at its own transparent opening. The invention also teaches methods and apparatus for controlling the dispersion of the magnetic flux field, thereby allowing the flux field to be focused in a controlled manner. This allows magnetic signals to be transmitted into or through such magnetically permeable and electrically conductive material with lowered power consumption.

19 Claims, 30 Drawing Sheets

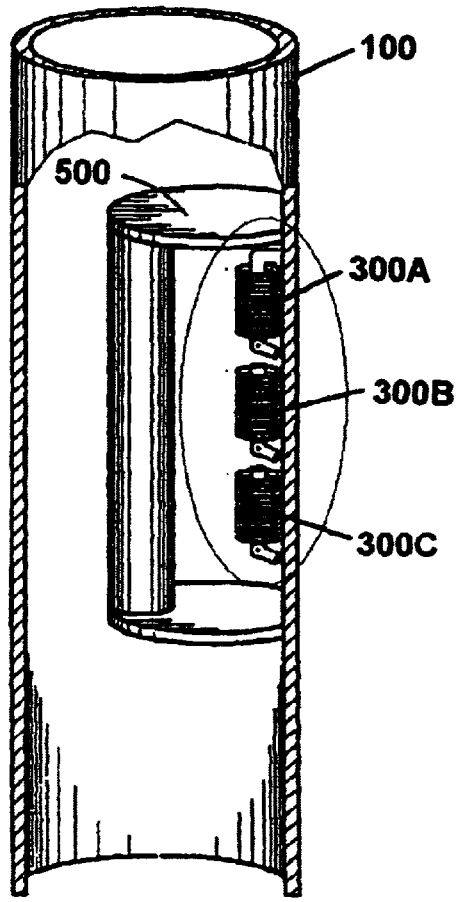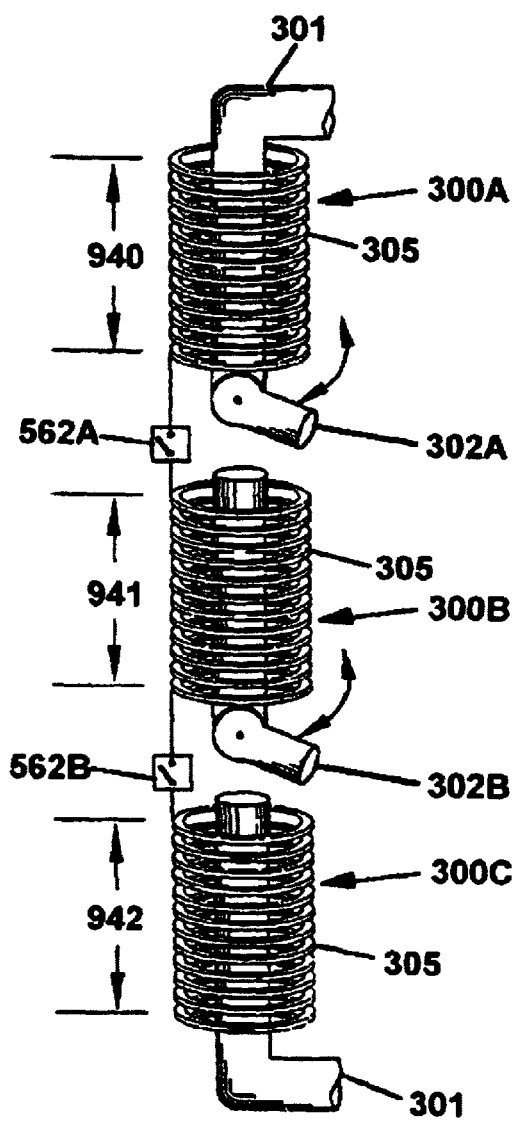
FIG. 9A
FIG. 9B

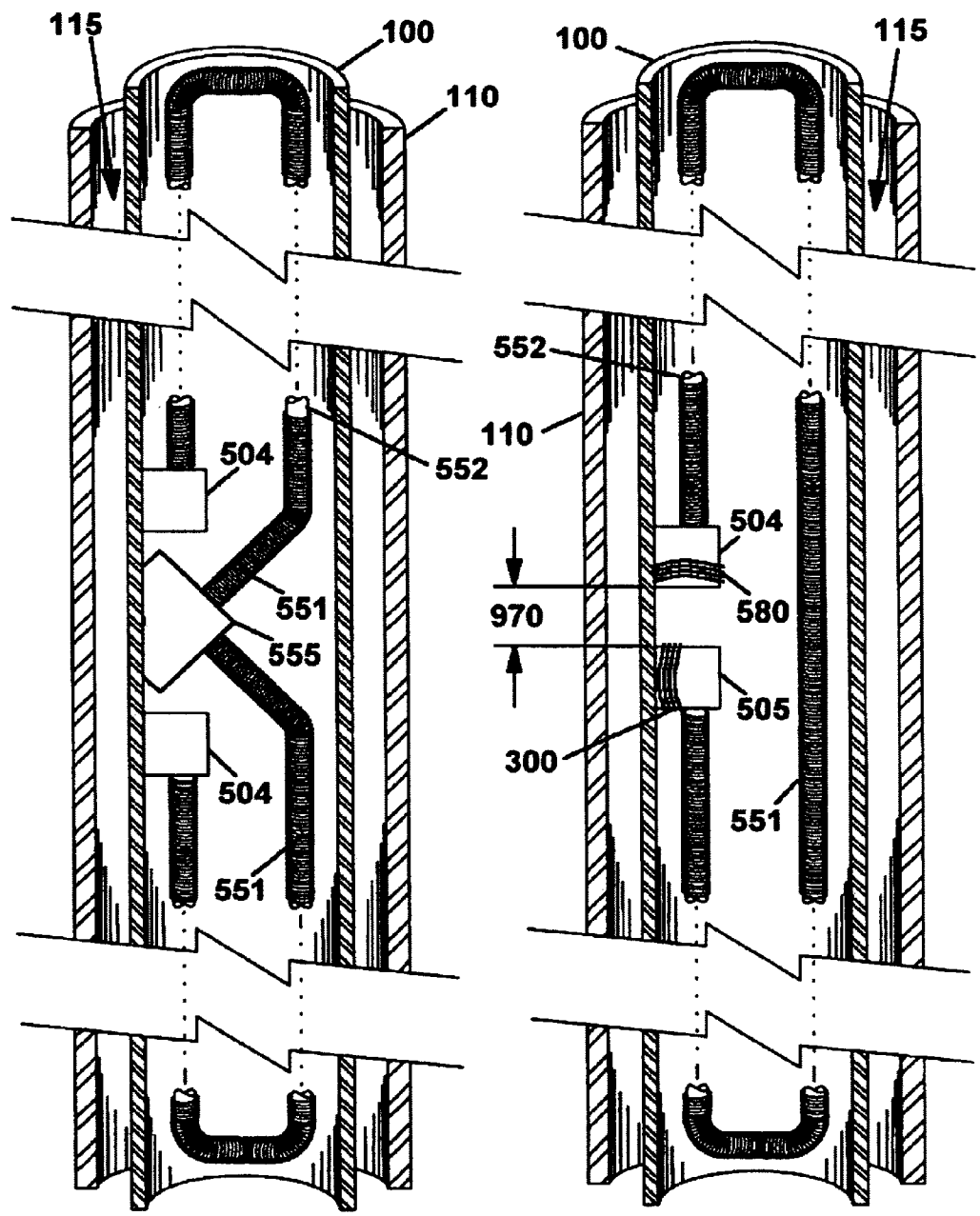
FIG. 20A   FIG. 20B

METHOD AND APPARATUS FOR CONTROL OF MAGNETIC FLUX DIRECTION AND CONCENTRATION

CROSS REFERENCE TO RELATED APPLICATION

The application claims the benefit of U.S. Provisional Application No. 60/166,696, filed Nov. 20, 1999.

BACKGROUND OF THE INVENTION

1. Field of the Invention

The present invention relates generally to transmitting and receiving electromagnetic energy through or across materials that have previously been barriers to the penetration and passage of this type of energy. Specifically, the present invention relates to a method and apparatus for transmitting electromagnetic energy into or across ferromagnetic materials, paramagnetic metals or other electrically conductive materials that are magnetically permeable. These materials are barriers through which electromagnetic energy typically cannot penetrate into or pass through.

The invention also relates to a method and apparatus that can concentrate the magnetic flux field lines penetrating into a small volume region of the barrier material. This reduces the power required to fully or partially saturate the selected region of the barrier material.

Further, the invention relates to a method and apparatus that bends magnetic flux lines as they penetrate through such barrier material. This bending is a result of the changed permeability of the barrier material. This magnetic flux bending can be used to focus the magnetic flux as it penetrates through the barrier material into the matter or objects on the other side of the barrier. More specifically, the controlled focusing of the magnetic flux partially counteracts the normal rapid geometric spreading of the flux field. In turn, concentrating the magnetic flux allows distant sensing of or focusing upon objects using much less power than would otherwise be required.

The invention relates to a method and apparatus comprising at least one electromagnet or permanent magnet capable of at least partially. saturating a volume region of barrier material. The apparatus also comprises one or more transmitter magnets having means to simultaneously create oscillating magnetic flux lines penetrating into the saturated or partially saturated volume region of the barrier material. The device also contains means for receiving electromagnetic signals from or across the area of saturation. The apparatus may also include means to vary in a controlled manner the frequencies of the oscillating magnetic flux field.

The degree or level of saturation of the volume area of the barrier region may be controlled to create magnetic lenses that focus the flux field lines. More particularly, the present invention relates to a method of studying the properties or characteristics of a barrier material fully or partially saturated with magnetic flux. This is performed by detecting and measuring the magnetic flux field induced by electric current (eddy currents) generated by the passage of the transmitted oscillating magnetic signal permeating into or through the affected volume region of the barrier material. The method and apparatus of the invention do not require physical contact with the barrier material for the detection or study of the properties of the barrier material or objects on the opposite of the barrier material. The apparatus may be stationary and the barrier material being studied being moved in relation to the stationary apparatus, or the apparatus may be moving across a surface of stationary barrier material. The invention also pertains to an apparatus that can be used to determine or measure the electrical characteristics or electrical properties of such objects existing behind or on the opposite side of the barrier material.

2. Description of Related Art

There are many examples of the use of electromagnetic (EM) energy for sensing and measurement. However, materials that are electrically conductive and are magnetically permeable act as barriers to the use of EM energy for sensing and measurement. (These barriers are hereinafter termed "Barrier Materials" or "EM Barriers".) Magnetic permeability is the ability of a material to absorb magnetic energy. The limitation in sensing or measurement by electromagnetic energy through EM Barriers has prevented utilization of EM energy for sensing or measuring through carbon steel tanks, pipelines, well casings and the like.

There has long been a need for a device that can make Barrier Materials transparent or semi transparent to EM energy. Also, there has been a need for a device that can make Barrier Materials transparent or semi-transparent for a sufficiently broad spectrum of EM wave frequencies. This would permit EM energy to be used to obtain useful measurements of the electromagnetic properties of electrically conductive matter or objects (hereinafter "Objects") existing within or on the opposite side of the EM Barrier.

It is well known that ferromagnetic and paramagnetic materials are electrically conductive. It is also well known that magnetic energy is dissipated by both conductive and ferromagnetic or paramagnetic material. The absorption of magnetic energy is due to the molecules of such material responding to the magnetic component of EM energy. It is this molecular response that consumes or absorbs magnetic energy. The higher the permeability, the greater the capacity to absorb EM energy. Ferromagnetic carbon steel casing has a permeability of about 2,000 to 10,000 webers/amp, depending on the specific chemical structure of the material.

On the other hand, non-ferromagnetic metals such as aluminum, copper, and stainless steel do not absorb magnetic energy from permanent magnets or electromagnets generated by direct current. They have a permeability of one (1) but are also highly conductive of electric energy. Air also has a permeability of 1 but is significantly less conductive. Transmitting an EM wave through aluminum, therefore, is much different than transmitting an EM wave through air. Since aluminum is an excellent electrical conductor, part of the EM wave is readily dissipated. In the near field to a low impedance transmitter antenna (i.e., within 5 wavelengths of the transmitter antenna), the magnetic field predominates. The fact that the magnetic field predominates allows the magnetic signal to penetrate a non-ferromagnetic material, e.g., aluminum. All oscillating EM signals through aluminum will experience attenuation or damping because the electrical conductivity of the aluminum generates eddy currents that dissipate the EM wave.

The situation changes dramatically when aluminum is replaced by a ferromagnetic material, e.g., carbon steel. The much higher carbon steel permeability readily dissipates even the near magnetic field.

The inspection or detection of material properties, including but not limited to location, thickness, corrosion, defects, cracks or anomalies, has required the use of Gamma rays, X-rays, conducting a DC electric current through the EM Barrier Material, use of acoustic devices or other work intensive methods.

Gamma rays require a radioactive source and provide limited penetration. It requires cumbersome equipment and safety precautions. The use of X-rays requires use of relative high electrical power, as well as cumbersome equipment and safety precautions. The evaluation of the data collected from gamma ray and X-ray devices requires the viewing and interpretation of the photos or data by specially trained personnel. Many gamma ray and X-ray devices and methods are also not easily adapted to a continuous recording of data during ongoing industrial operations.

The use of electric current or acoustic signal passing through Barrier Material requires the material to be physically contacted. This requires the insulation coating or other covering matter to be wholly or partially removed. It also impedes the prompt or continuous measurement of the material in an ongoing industrial or otherwise uncontrolled environment. These methods or devices also have limited reliability or sensitivity.

Conducting DC currents through the barrier material, of course, requires contact with the Barrier Material and provides limited data. The present invention allows detection of properties and defects at greater distances from the target of the study. The present invention also allows more detailed description of the EM Barrier properties and the detection of smaller defects within or on both sides of the Barrier Material and within the Barrier Material. The present invention also allows the detection of Objects on the opposite side of the EM Barrier. The invention requires minimal power. It also does not require contact with the Barrier Material.

SUMMARY OF THE INVENTION

The present invention utilizes the material properties of the Barrier Materials to achieve transmission of EM Energy through the EM Barrier. It is well known that the strength of the magnetic field in a particular area is related to the density of magnetic flux lines penetrating that area. As the Barrier Material is subjected to an increasingly strong magnetic flux field, more and more of the magnetic dipoles of atoms of the Barrier Material begin to line up uniformly in response to the magnetic field. More specifically, this increasing magnetic energy causes the spin of the "odd" electrons occupying unfilled orbital shells of the atoms to begin to align in the same direction. This response or action of the electrons consumes magnetic energy. When the magnetic energy is increased sufficiently within a volume region of the Barrier Material, the spin of all of the odd electrons within that volume region will be aligned in the same direction. When the electrons of the atoms cannot absorb any more magnetic energy, that volume of the Barrier Material is in a state termed "magnetic saturation." During magnetic saturation, the permeability of the Barrier Material approaches one. Thus, in a saturation state, the permeability of the Material approaches the permeability of aluminum or air. However, the EM Barrier Material is still electrically conductive. Therefore an oscillating EM wave is still subject to damping by eddy currents generated by conduction of the EM energy through the Barrier Material.

The portion of the Barrier Material saturated with magnetic energy is "transparent" with respect to its permeability to the transmission of a second source of magnetic energy. While transparent, the Barrier Material no longer acts as a complete barrier to the penetration of low frequency magnetic energy or magnetic energy generated by DC current. (There is, however, some loss of magnetic energy resulting from eddy currents being generated in the saturated Barrier Material. As the frequency increases, the conductive losses increase until the skin depth becomes much less than the thickness of the Barrier Material. As used herein, "skin depth" is proportional to the inverse of the square root of the product of permeability, current and frequency.)

Therefore, a separate oscillating source of magnetic energy (preferably at a different frequency than the frequently utilized to saturate the Barrier Material) can be transmitted into or through the Barrier Material. When an electrically conductive "Object," as used herein, is within the oscillating magnetic flux field, the oscillating magnetic field induces a corresponding eddy current in the Object. This induced electrical eddy field in turn induces another corresponding (and oscillating) magnetic field that is transmitted by the Object. This oscillating magnetic flux field, which can be at frequencies different from the magnetic wave transmitted through the saturated or near saturated Barrier Material, also is able to pass through the saturated area of the Barrier Material in a return direction and by a reverse process of the original oscillating transmitted signal. This return oscillating magnetic wave can also be detected and measured by a receiver located on the transmitter side of the Barrier Material when positioned in close proximity to the original or a separate saturated area of the Barrier Material. The apparatus is therefore allowing the magnetic component of EM energy to "see through" the Barrier Material. Conversely, it can then be said that the Barrier Material no longer is a barrier to EM energy. The method and apparatus of this invention is hereinafter termed "Magnetic Transparency Generator" or "MTG." The Magnetic Transparency Generator saturates Barrier Material with the magnetic flux or magnetic component of an EM energy source. A volume region of a Barrier Material may be completely saturated or partially saturated in a controlled manner.

The volume region of the Barrier Material that is in a state of saturation or near saturation is alternately termed herein as "Transparent Material", a "Metallic Transparency,"™ "Magnetically Transparent" or simply "Transparent." The invention may utilize one or more Magnetically Transparent volume regions within the Barrier Material. The term "Partial Barrier", "Partial Barrier Material", "Partial Magnetic Transparency" and "Partially Transparent Material" are alternatively used herein to describe the volume regions of the Barrier Material that are significantly, but not totally, saturated.

If complete saturation is desired, multiple designs exits for creating the substantial constant or low frequency magnetic flux field. It has been found that energy can be conserved yet still produce a controlled Transparent volume region by bucking field lines outward from the MTG and into the EM Barrier. This can be accomplished by placing at least two like poles together. The field lines repel each other, thereby causing the concentrated field lines to be pushed far into the Barrier Material. The component of the apparatus utilized in containing the plurality of like magnetic poles is termed the "Magnetic Culminator." The separate oscillating EM wave passes through the Barrier Material without the utilizing the Magnetic Antenna or Magnetic Lensing effect.

An alternate application of the invention is utilizing the MTG to couple with a selected portion of the EM Barrier. Coupling does not require the transmission of an EM Signal out from the EM Barrier, but rather by the reduction of the permeability of the EM Barrier sufficient that the higher oscillating transmitter signals may permeate the thickness of the EM Barrier volume region between the opposing magnetic poles of the MTG.

If a Partially Transparent volume region is created, a separate oscillating EM wave is transmitted into this Partially Transparent volume region, preferably of a higher frequency than the first EM energy source. Eddy currents are generated in the Partially Transparent Material. An oscillating magnetic field is induced by these eddy currents. At least some portion of the magnetic flux from this induced magnetic field is transmitted out from the Partial Barrier Material. However, the lines of flux are bent or altered as they are emitted out from the surface of the Partially Saturated Material into the surrounding environment. This bending of magnetic flux can be controlled, allowing the lines of magnetic flux to be focused on an Object existing on the opposite side of the Barrier Material from the MTG transmitter. This focusing partially counteracts the normal rapid geometric spreading of magnetic flux. Concentrating the magnetic flux allows distant sensing using much less power. When utilized in this manner, the MTG includes a Magnetic Lens™ capability.

If a portion of the Barrier Material is only partially saturated with magnetic energy, it may still be become transparent with the addition of a second source of EM energy. Also, Barrier Material that is partially saturated experiences a significant reduction of permeability. In a state of reduced permeability, the Barrier Material will more readily allow higher frequency oscillating energy to penetrate through the surface and into the interior of the Barrier Material. This can allow study or inspection of the interior of the Barrier Material. It should be noted that this higher frequency energy would only penetrate into the surface of the Barrier Material proportional to the skin depth when in an unsaturated state.

It will be readily appreciated that the geometry of placement of the transmitter generating the second source of EM energy in relation to the Transparent volume region of the Barrier Material is important. It will also be readily appreciated that the placement of the receiver in relation to the Transparent volume region will also be important. It should also be appreciated that the placement of the receiver in relation to the transmitter of the oscillating magnetic signal will also be important.

The oscillating magnetic flux lines are induced by eddy currents within a Barrier Material. The eddy currents are induced by an oscillating magnetic flux field generated by a transmitter contained within the apparatus. The Partial Transparency is accomplished by a magnetic field generated by a strong low frequency or direct current. The Magnetic Transparency region is the term defining the region where there has been a reduction of Barrier Material surface permeability to allow the entry of the oscillating energy from the transmitter to enter into the surface of the Partially Transparent Barrier Material. The same coils may generate the low frequency current for permeability reduction and the transmitter frequency if the impedance matching to amplifiers is observed and the frequencies are near enough to each other.

An alternate embodiment of the invention utilizes separate transparency coils and transmitter coils. In this configuration, the transparency coils can partially or fully saturate the Barrier Material in a simple or geometric pattern that could vary with time. In this way the bending of the magnetic flux lines could be varied with respect to time and space thereby moving the focal area temporally and spatially. Magnetic Transparency would represent full or near complete saturation with the permeability approaching 1 weber/amp. Partial metallic transparency would allow transmission of a portion of the transmitter energy through the Barrier Material, the remaining transmitter energy would generate powerful internal eddy currents in the Barrier Material.

The invention utilizes one or more Magnetic Transparency Generators (or MTG) each containing a combination of a low frequency oscillating current or constant DC generated current combined with at least one higher frequency oscillating transmitter current or receiver. The relationship of the low and high frequency current is that the higher frequency current will be at some multiple of the low frequency sufficient for measurements desired. The low frequency or direct current is utilized to generate a field of magnetic flux for fully or partially saturating the Barrier Material. This magnetic flux field causes the Barrier Material to become Transparent or Partially Transparent to or in conjunction with the addition of at least one higher frequency EM wave (transmitter current). When partially saturated, i.e., State of Partial Transparency, the transmitter current (oscillating at a constant frequency) causes the level of saturation of the Barrier Material or Object to vary. This, in turn, causes the permeability of the material (Barrier Material or Object) to vary in some manner. This changing permeability, in turn, causes a nonlinear interaction creating a spectrum of frequencies of the eddy currents induced in the Barrier Material. This spectrum of varying eddy currents can be detected and measured as described elsewhere in this invention and is useful for the broadband study or determination of the electrical characteristics or other properties of the Barrier Material.

Low frequency current or a DC current is utilized for creating transparency in the Barrier Material since the flux field and the flux lines comprising the field remain constant in direction in relation to the higher frequency oscillating transmitter magnetic flux field. This flux field, used to completely or to partially saturate the Barrier Material, is hereinafter termed "Transparency Current" or "Transparency Field." The Transparency Current is utilized to saturate (or partially saturate) all or a portion of the Barrier Material.

An AC current generating component (hereinafter "Transmitter") of the MTG device can be used to generate the higher frequency transmitter current and associated higher frequency oscillating magnetic flux field. As indicated above, multiple higher frequency currents, each with separate frequencies, may be simultaneously utilized. The higher frequency current(s) is hereinafter termed "Transmitter Current", "Sensing Signal" or "Sensing Current." The flux field generated by the Sensing Current is able to penetrate into or through the Barrier Material as a result of the EM Barrier Material concurrently receiving the Transparency Current. When receiving the Transparency Current, the affected volume region of the Barrier Material is completely or partially saturated, i.e., the affected volume region of the Barrier Material has no ability (saturated) or significantly diminished capacity (partially saturated) to absorb additional magnetic energy. When partially saturated, the Barrier Material also has an increased capacity to absorb the higher frequency energy. This "Transparent" volume region of the Barrier Material i.e., partially or completely saturated volume region, behaves similar to that of aluminum or other material with permeability near 1 weber/amp. As already stated, the volume of the Barrier Material that is in the state of Transparency no longer acts as a barrier to electromagnetic energy, except through the properties of its continuing electrical conductivity.

It is well known that a fluctuating magnetic field with respect to time or space causes a separate electric current to be generated in electrically conductive material. Oscillating magnetic energy of the Transmitter Current (which may be generated by the Transparency Current) induces a separate electric current, i.e., eddy currents. These eddy currents may be generated in the unsaturated or partially saturated portion of the Barrier Material or in electrically conductive Objects located outside of the now Transparent Barrier Material. These eddy currents, also, are oscillating. Accordingly, these eddy currents generate a separate oscillating magnetic field about the Barrier Material or the Object. The characteristics or properties of the oscillating magnetic field may be measured by one or more signal receiving devices. Such devices are included within the scope of the invention. The signal receiving devices (hereinafter "Receivers") may receive the Object's induced magnetic field signal through the same Transparent volume region through which the oscillating magnetic flux is sent out or, alternatively, through at least one additional Transparent volume region.

It will be appreciated that the design of the MTG geometry will be important. It should also be appreciated that the MTG must be constructed upon a suitable frame or core. The Transparency Coil, creating the large magnetic flux needed to saturate or partially saturate the selected volume region of the Barrier Material, and the Transmitter Coil must be wound upon a core with a sufficiently large mass and permeability. This is also required of the material utilized as a Magnetic Culminator. It is critical that no part of the MTG become saturated. Accordingly the core framework of the MTG, referred to herein as "Flux Circuit Core" or "FCC" must be constructed of a highly permeable ferromagnetic material.

One variation of the invention utilizes an oscillating Transmitting Current penetrating a Partially Transparent Material. This oscillating current generates an oscillating magnetic flux field penetrating into a partially saturated Barrier Material. This oscillating current also induces eddy currents within the Barrier. The eddy currents induced within the Partially Transparent Barrier Material induce a separate oscillating magnetic field. The flux lines of this oscillating magnetic field radiate out of the Partially Transparent Material. Electrically conductive Objects located within the induced flux field radiating out of the Partially Transparent Barrier Material will also generate another and separate eddy current within the Object.

In this manner, the EM Barrier Material serves as an antenna for the transmission of EM energy. In addition, a Magnetic Antenna™ capability of the Partially Transparent Barrier Material can be utilized in a controlled manner to focus or direct the second and separate induced oscillating magnetic flux field. This feature is termed "Lensing" and the component termed a Magnetic Lens™.

Other variations of the Invention provide energy efficient, reliable and prompt method and apparatus to detect and locate micro defects, anomalies or other properties within or upon Barrier Materials. Examples where such ability is needed include the ability to detect structural defects, anomalies or cracks in Barrier Material, including welds or other connections or joining of or within the subject Barrier Material and Target Materials that are located within or covered by other matter. Examples of covered Target Materials can include structural reinforcing steel within concrete, multiple layers of Target Materials and other matter, such as braided or wound metal cables or multiple or overlapping metal plates, and Target Materials coated or painted with or encased within insulating resinous, plastic or similar diamagnetic matter.

Specifically, there are many applications for a device that could detect micro cracks in Target Materials. Such examples include but are not limited to the detection of cracks in railroad rails, offshore or underwater structures, bridges, pipelines, storage tanks, pressure vessels, autoclaves, hot isostatic presses, boilers, engines and similar structures subjected to mechanical stress, pressure, wear, heat, cold, variable temperature and pressure, or corrosive environments.

The Magnetic Transparency Generator provides an apparatus and method for detection that is non-contacting, thereby eliminating the need to remove surface coverings or coating. It also minimizes the need for adjusting or normalizing the data collected for the specific surface condition of the Target Material. This allows the measurements to be made more rapidly. It also minimizes wear on the apparatus of the Invention. It also allows detection of such defects, etc., at distances greater than possible by existing methods.

Applications of the MTG invention for use in cased wells or other confined area require an apparatus design capable of generating very strong magnetic flux fields in a narrow diameter, e.g., in a diameter of two (2) inches or less. The high flux densities needed to partially or to completely saturate the Barrier Material are generated through long coil windings. The material comprising the core of the winding is preferably a high permeability material. The MTG device may also utilize a highly permeable component that serves as the junction of a plurality of like magnetic poles. This component is termed a "Magnetic Culminator."

It is, therefore, an object of this invention to provide a method and device capable of creating a magnetic field sufficient to partially or completely saturate EM Barrier Materials.

It is therefore another object of this invention to provide a method and device for the measurement of properties of Barrier Materials. It is another object of the invention to provide a method and device that can detect anomalies in the range of sub thousandth of an inch. It is yet another object of the invention to provide a method and device that can continuously collect data as the device is passed over the Barrier Material, thereby allowing the invention to be used in conjunction with other operations and with minimum disruption of the activity.

It is another object of the invention to provide a method and means to determine the electrical properties of Objects within or in the vicinity of the EM Barrier Material.

It is yet another object of the MTG device to provide resistivity measurements through EM Barriers such as steel casings in oil wells, steel storage tank walls and pipelines.

Another feature of the present invention is to provide resistivity measurements simultaneously through multiple layers of EM Barrier Materials, including but not limited to ferromagnetic pipelines and casings.

Another feature of the present invention is to determine the thickness, corrosion, location, continuity or the permeability and conductivity of the Barrier Material.

Another feature of the present invention is to provide detection of liquid interfaces or sedimentation levels through EM Barriers, such as but not limited to steel and iron tanks and pipes.

Another feature of the present invention is to provide resistivity and sediment detection in refinery tanks and pipes.

Yet another feature of the invention is to provide through wall flow rate and resistivity measurements and switches in pipelines and tanks without using hot taps or other intrusive methods.

Still another object of the present invention is the measurement of outside casing coating conditions or corrosion from inside the casing or tubing.

Another object of the present invention is to provide resistivity logging through casing and tubing in an oil or gas well.

Another object of the present invention is that it does not require contact with the surface of the Barrier Material or other Objects.

Still another object of the present invention is that surface conditions are not important because inductive fields do not require contact and can be done at a distance.

Still other features of the invention will allow application as dip angle of formation measurement, imaging tool, through casing resistivity (in situ), through casing directional resistivity, through casing water flood detection, through casing cross well resistivity, through casing ranging, air weathering layer measurements, rock analysis using spectral sweep, casing thickness measurement, logging tool for cased and open hole, airborne medium and deep exploration and ranging, exploration through salt marsh, casing corrosion measurement and through separator liquid level measurement.

Yet other features of the invention will allow testing or tracking of through pipeline pig tracking, through pipeline hydrate detection, through pipe flow meter, through pipe water detection, and through pipe resistivity.

Yet other features of the invention will allow subterranean pipeline location and ranging, pipeline leak detection, and sub-sea pipeline location.

Yet another feature of the invention is the ability to detect cracks, corrosion and other properties of Barrier Materials without requiring any physical contact with the Barrier Material and without requiring removal of protective coatings from the Barrier Material.

Other applications of the invention in the food processing industry include water and liquid percentage through tank wall, salt content through tank walls, liquid level through tank and non-intrusive flow meter.

Yet other applications of the invention in the pharmaceutical and medical industry include water and/or ion content through vat, chemical salt content through vat, liquid level through tank non-intrusive flow meter, non-intrusive stomach acid measurement and local non-contacting, non MRI imaging and non contacting measurements of electrolytes in the body.

Other medical applications include uses to focus magnetic energy for imaging and without the necessity of contacting the target or subject of the imaging.

Other applications of the invention applicable to turbines, pumps and compressors include through housing blade inspection and water detection in hydraulic lines.

Applications in construction include through concrete detection of re-bar voids and moisture, concrete thickness determination, through metal and concrete measurement and subsurface road and highway inspection. Aircraft applications include through wing detection of flaps, rudder or aileron movement or position, and through wing detection of ice. Other applications include detection of water in fuel tanks or lines, long distance ranging, movement detection through structures, rocks, subsurface, wooded areas, through hull proximity detection, through salt water plastic mine detection and through metal or earth ranging.

Yet other applications include determination of depth of water penetration during crop watering, non-contact analysis of chemical fertilizer added in soil and its absorption status, motion detection through structures and determination of water content and consistency through vats or conveyors.

Additional features and advantages of the invention will be set forth in part within the description that follows, and in part will become apparent from the description, or may be learned by practice of the invention. The features and advantages of the invention may be realized by means of the combinations and steps particularly pointed out in the appended claims.

Other variations, changes or modifications of the invention will be recognized by individuals skilled in the art that do not depart from the scope and spirit of the invention described and claimed herein.

BRIEF DESCRIPTION OF THE DRAWINGS

The accompanying drawings which are incorporated in and constitute a part of the specification, illustrate preferred embodiments of the invention and, together with the general description of the invention given above and the detailed description of the preferred embodiments given below, serve to explain the principles of the invention.

FIGS. 9A and 9B illustrate additional embodiments where the penetration distance outside of the Barrier is increased proportionally with the length of the coil.

FIG. 20A is another embodiment of the present invention for use with well logging through casing where the electromagnet generating the Transparency Current contains a single magnetic pole located between two opposite or unlike poles.

FIG. 20B is another embodiment of the present invention for use with the well logging through a casing where the Magnetic Transparency Generator contains a single pair of North-South magnetic poles.

Figure 1A:
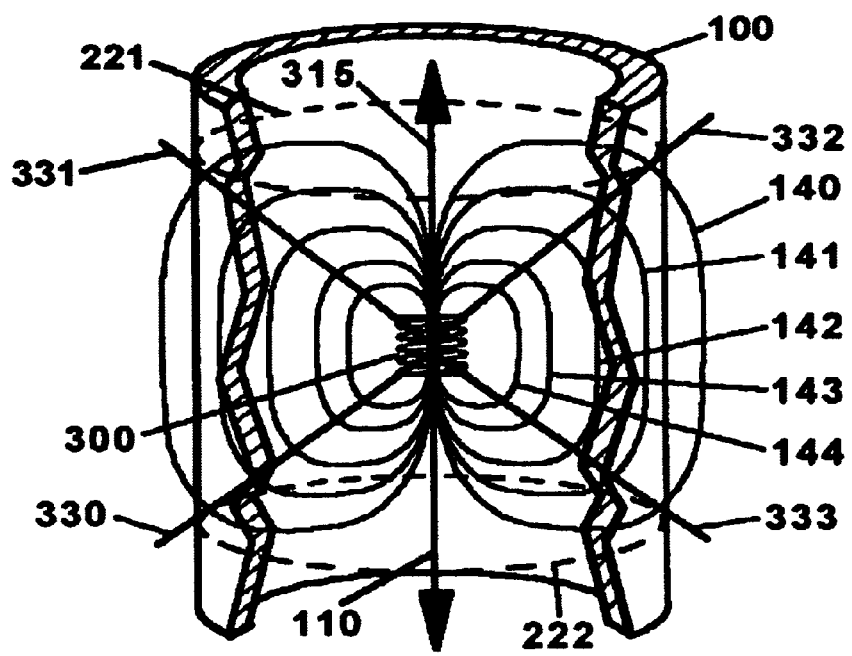
FIGS. 1A, 1B, 1C and 1D illustrate several magnetic flux field lines geometry's of the Sensing Signal with respect to the Transparent volume region within an EM Barrier Material.

The above general descriptions and the following detailed descriptions are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

To achieve the foregoing objects, features, and advantages and in accordance with the purpose of the invention as embodied and broadly described herein, a method is described for transmitting EM energy into or across Barrier Material and receiving a return signal. The first step is creating Transparency or Partial Transparency in the Barrier Material by a first electromagnetic wave adjacent to or in close proximity to the EM Barrier. This electromagnetic wave may be generated by a permanent magnet, or an electromagnet powered by DC current or an electromagnet powered by AC current. The AC powered EM wave will preferably be of a relatively low frequency oscillation.

The second step is fully or partially saturating a volume region of the Barrier Material with the magnetic component of this first electromagnetic wave. The third step is creating, by means of a Transmitter, at least one second oscillating electromagnetic wave having a higher frequency than the first electromagnetic wave. The fourth step is engaging the magnetic component of this second electromagnetic wave with the Barrier Material when the Barrier Material is Transparent or Partially Transparent. When almost fully saturated, the EM Barrier becomes Transparent to electromagnetic energy. When partially saturated, the Barrier Material is Partially Transparent to such energy.

For Partially Transparent, sometimes termed "Partial Barriers" herein, the fifth step is the second and oscillating electromagnetic energy created by the Transmitter, inducing eddy currents in the Partial Barrier. These eddy currents are also oscillating. The sixth step is the oscillating eddy current (within the Partial Barrier Material) generating a separate field of oscillating magnetic flux. The flux lines of this magnetic field extend beyond the Partial Barrier into the surrounding environment. In this manner, the Partial Barrier acts as an antenna, broadcasting an oscillating magnetic flux field and the device and array is termed a Magnetic Antenna™. This oscillating magnetic flux field will induce eddy currents in electrically conductive matter, i.e., Objects that are beyond the Barrier Material but within the induced flux field. The next step is the eddy current generated within the Object inducing a separate field of magnetic flux. The lines of this flux field also extend beyond the Object. This flux field also generates eddy currents within the Partial Barrier. These eddy currents induce a magnetic field that is detected and measured by a receiver contained within and comprising part of the invention.

The invention also comprises a device, termed Magnetic Transparency Generator or MTG, for creating a Transparency or Partial Transparency in Barrier Material. The apparatus comprises one or more magnets to achieve complete or partial saturation of one or more volume regions of a Barrier Material, one or more transmitters (or single coil that can be carrying both the saturation current plus the transmitter current), one or more switches, low noise amplifiers (LNA), Receivers, frequency generators, pulsers, and power sources. The invention utilizes at least two separate magnetic flux fields. The first magnetic flux field is utilized to create a Transparent or Partially Transparent volume region within an EM Barrier. This is the magnetic flux field of the Transparency Current or Transparency Field. This magnetic flux field may be generated from either a low frequency oscillating source or from a direct current source, i.e., D C current. The additional magnetic flux field(s) is generated from a Transmitter and is termed the Transmitter Current, Sensing Current or Sensing Signal. It is preferred that the Sensing Current oscillate at a frequency that is some multiple of the frequency of the Transparency Current.

In practicing the Invention, it is often advantageous to have high concentrations of magnetic flux. It is important that the flux be anisotropic in its direction. That is, it is necessary to have the flux directionally concentrated. In order to conserve power consumption, it is often advantageous to minimize the size of a Transparency volume region. This can be achieved by having a high concentration of flux lines in a small area of the Barrier Material or an Object. The flux densities may be many thousands of Gauss per square centimeter.

There are many geometry's possible to achieve very high concentrations of directional flux. In one embodiment, efficiency is achieved when the device generating the Transparency Current, is oriented to the surface of the EM Barrier in such a manner that the highest concentration of magnetic flux lines are in close proximity and aligned perpendicular to the surface of the EM Barrier.

Another embodiment is a configuration for the device generating low frequency electromagnetic energy where the magnetic portion of the energy is emitted from a location where a plurality of like magnetic poles are placed in close proximity. This portion of the device incorporates a material (hereinafter the "Magnetic Culminator") placed between the like poles. The Magnetic Culminator comprises a material that is highly permeable and of great mass so that the Magnetic Culminator will not be placed into a state of Transparency prior to the desired volume region of Transparency or Partial Transparency being achieved in the EM Barrier. The Magnetic Culminator, configured in such a manner that it may be in proximity to a plurality of like magnetic poles, causes the lines of magnetic flux to be pushed away from the like magnetic poles and into the EM Barrier.

The geometry of the Transparent volume region is also important in relation to the additional magnetic flux field(s), or Sensing Signal(s). It is preferred that the surface area of the Transparency in the EM Barrier Material be sufficiently large to receive at least the most concentrated area of magnetic flux field lines of the oscillating magnetic Sensing Signal from the Transmitter. The larger this Transparency becomes, however, the more power that is required.

Reference will now be made in detail to the present preferred embodiments of the invention as described in the accompanying drawings.

FIG. 1A illustrates the oscillating magnetic Sensing Signal field line geometry 140–144 with respect to the location of the Transparent area of the cylindrical EM Barrier 100 having an upper boundary 221 and a lower boundary 222. The magnet required to create the Transparent area is not illustrated. The area of the strongest magnetic flux propagated by the Sensing Signal Transmitter 300 originates along an axis 315. As used herein, the area of the strongest magnetic flux is the location where the most flux lines are concentrated, i.e., flux line density. This axis is parallel with the central axis 110 of the EM Barrier. Note that for a field line to penetrate though the Barrier Material 100, the field line must exit and return through the EM Barrier with the Transparent area 200. This area is also represented as the space between 330 and 331, and the space between 332 and 333 at the intersection of these lines with the EM Barrier 100. Lines 330, 331, 332 and 333 originate from the sensing signal transmitter. They show the geometric relationship between the field lines from the Transmitter 300 to the boundaries of the Transparent volume region 200 of the EM Barrier 100. The intersections of lines 331 and 332 with the EM Barrier 100 are at points along the upper boundary 221 of the Transparency. Note that in FIG. 1A, only one 140 of the 5 field lines depicted permeates through the EM Barrier.

Figure 1B:
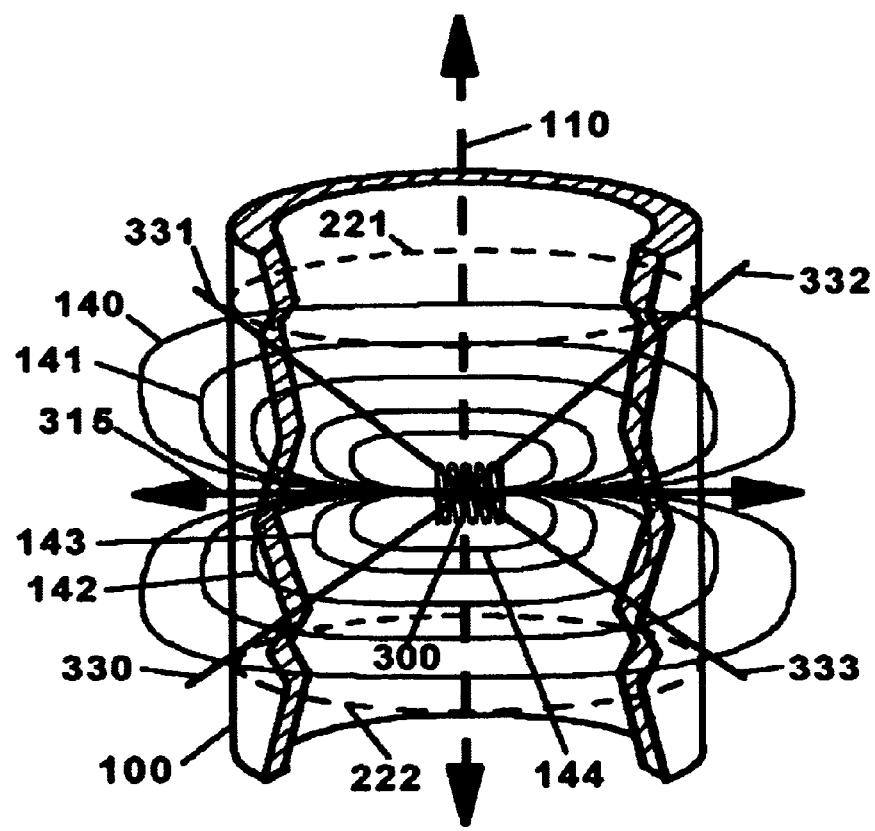

FIG. 1B illustrates another Sensing Signal field geometry 140–144. The area of the strongest magnetic flux originates from the oscillating magnetic field generating device 300, propagating the Sensing Signal, along an axis 315 at right angles to the central axis 110 of the EM Barrier 100. The Transparent volume region 200 is created by a separate magnet (not illustrated). The Transparent area 200 of the EM Barrier 100 has an upper boundary 221 and a lower boundary 222. This configuration of the Sensing Signal Transmitter 300 to the central axis 110 of the EM Barrier is preferred since it results in a greater concentration of the Sensing Signal's flux reaching the Transparent area of the EM Barrier. In FIG. 1B, field lines 140 and 141 permeate through the EM Barrier within the Transparent volume region 200.

Figure 1C:
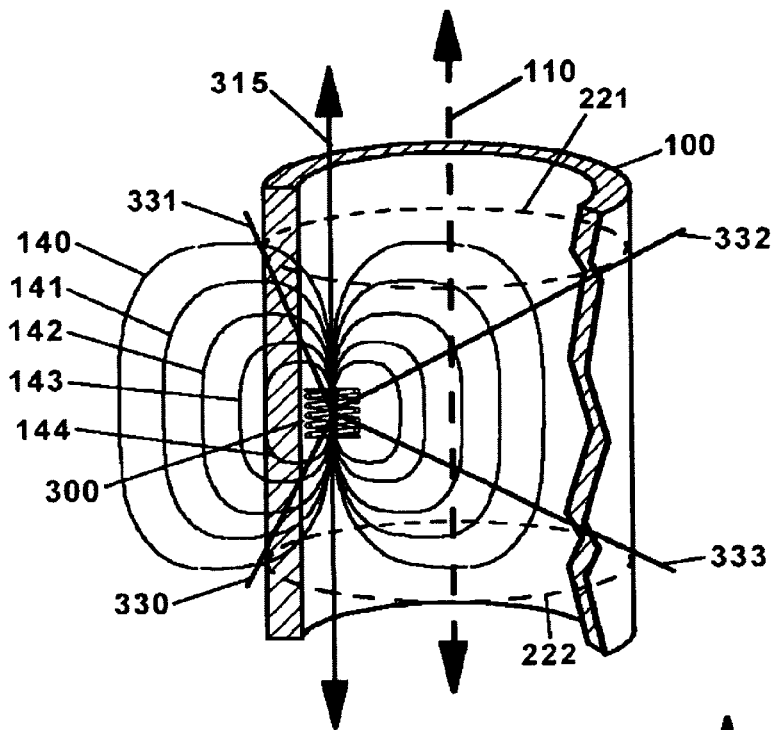

FIG. 1C illustrates another embodiment wherein the sensing signal Transmitter 300 is placed in close proximity to one side of the EM Barrier 100. The axis 315 of the Transmitter 300 is parallel to the center axis 110 of the EM Barrier 100. Note the angle of the intersection of lines 330 and 331 is broadened. There are 5 field lines 140–144 penetrating the Barrier Material 100 between lines 330 and 331. The angle of lines 332 and 333 has narrowed. No field lines are penetrating the EM Barrier in the Transparent volume region 200 between lines 332 and 333.

Figure 1D:
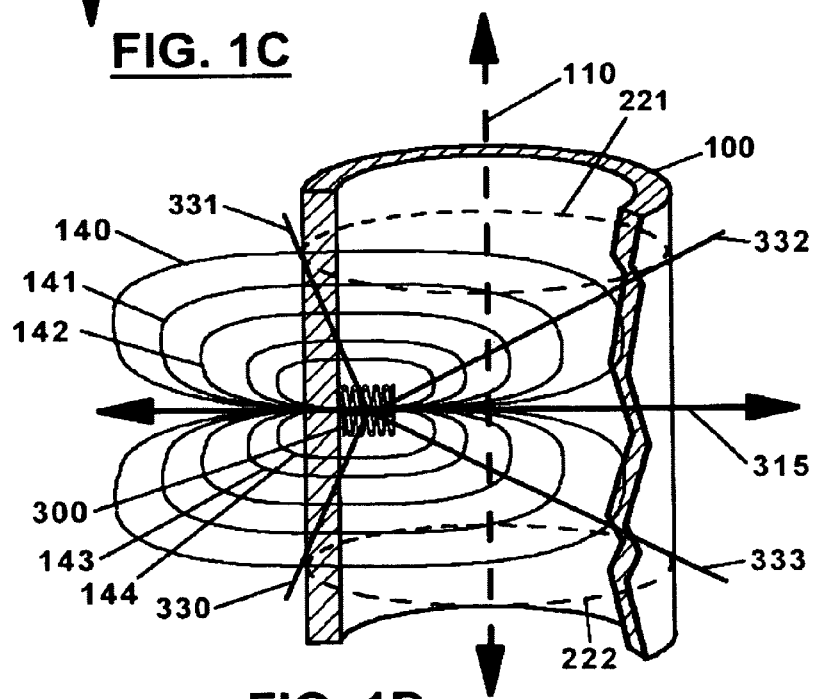

FIG. 1D illustrates another Sensing Signal field line geometry 140–144 from the Sensing Signal Transmitter 300. As in FIG. 1C the Transmitter 300 is placed in close proximity to the transparent area of the EM Barrier 100. Note that lines 330 and 331 illustrate a significantly broadened area though which field lines may penetrate through the EM Barrier 100. Correspondingly, the area for sensing signals to penetrate between lines 332 and 333 has narrowed. Note that 5 field lines penetrate the EM Barrier between 330 and 331. No field lines penetrate the EM Barrier 100 along the opposite direction of the axis 315.

Figure 2:
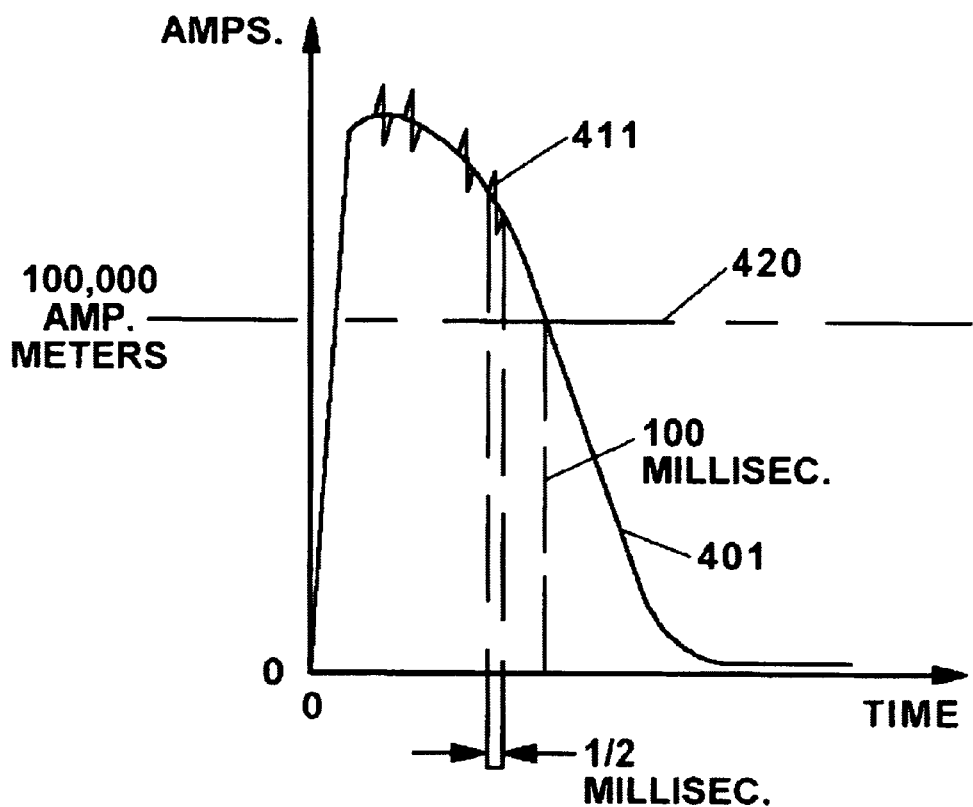
FIG. 2 illustrates the wave pattern of an oscillating transparency current with a superimposed higher frequency oscillating Sensing Current.

FIG. 2 illustrates the graph of current versus time with respect to the present invention. Illustrated on the graph are the spikes 411 of the higher frequency oscillating electromagnetic wave of the Sensing Signal from the signal transmitting device disposed along a lower frequency oscillating Transparency current 401. In one embodiment, the Sensing Signal may be transmitted only during the duration of each cycle of the oscillating Transparency current that is above the level required for saturation 420. Among other advantages, this embodiment minimizes energy consumption. In this embodiment, it is possible to have multiple Sensing Signal transmissions during each phase that the Transparency current 401 is above the saturation level 420. Note also that the Transparency Current may not achieve the level of current necessary to saturate the targeted area of the EM Barrier Material. However, the distinctively higher frequency sensing signals will Couple, i.e., penetrate, into the EM Barrier or, alternatively, be of sufficient magnitude to saturate a volume region of Transparency or Partial Transparency when combined with the Transparency current and therefore directly penetrate through the Barrier Material. In other embodiments, the Transparency current may be generated from at least one permanent magnet, low frequency AC current or direct current DC electromagnetic device.

As described elsewhere herein, the higher frequency Sensing Signal may be generated by a Transmitter, comprised of a smaller coil of conductive material, powered by alternating current and at a controlled frequency, wrapped upon or near the larger coil. The larger coil generates the Transparency Current or Transparency Field. It is wrapped with conductive material and powered either by DC current or an oscillating current. Preferably, the Transmitter Current is at a higher frequency than the Transparency Current. It is preferred that the frequency be at least a multiple of 10 greater than the frequency of the Transparency Current. This higher frequency allows 10 wavelengths of measurement before the Transparency is closed.

In FIG. 2, the high frequency Sensing Signal 411 is demonstrated being pulsed at less than 0.5 milli-seconds rates. If the lower frequency Transparency Current 401 generated by the larger coil, is pulsed or activated "on" for 10 milli-seconds 430, there is sufficient time for twenty Sensing Signals (e.g., with a wavelength of only 0.5 millisecond), to go out to a near Object and take 10 wavelengths of measurements during the "on" pulse of the Transparency Current. During this 10 milli-second pulse, the Transparency current will exceed the saturation energy level 420.

For most applications, a power source of 300 watts or less is sufficient to create the signal and saturation. For thicker material, strong pulses and signals may be generated by utilizing charge storing capacitors. These capacitors are slowly charged than quickly discharged through a switch contact and then through the low impedance large coil. At the same time, the higher frequency small signal coil is pulsed.

Figure 3:
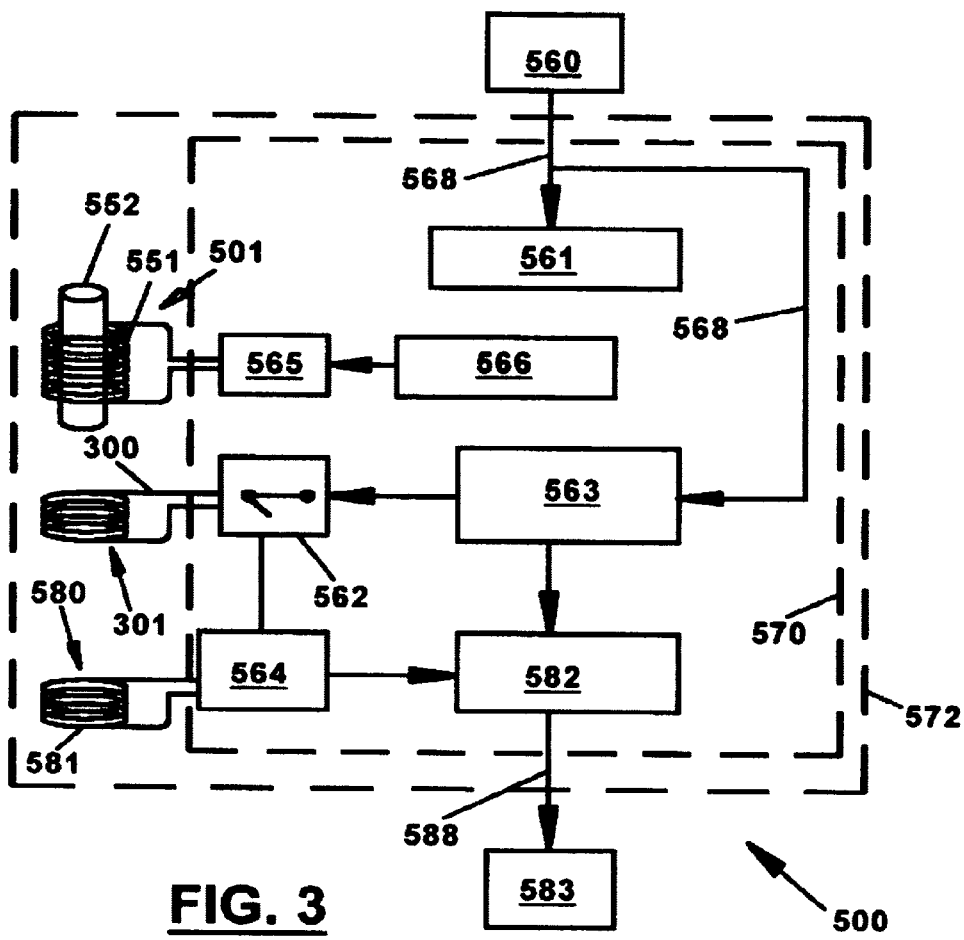
FIG. 3 is a block diagram of the components comprising one embodiment of the present invention.

FIG. 3 is a block diagram of one embodiment of an apparatus of the present invention. FIG. 3 illustrates an embodiment 500 of the Magnetic Transparency Generator of the present invention. The embodiment 500 comprises a large coil for generating the Transparency current 551, a small coil, comprising the Transmitter 300, a switch 562, a low noise amplifier (LNA) 564, a Receiver 580, a frequency generator 563, a pulser 566, one or more capacitors 561 and a power source 560.

One application of this invention is to ascertain or measure the electromagnetic properties of matter or Objects outside a Barrier Material. An example is obtaining measurements of Objects outside of a well casing.

Calculations and experiments have shown a significant transmitted pulse spreading as it passes through the well casing (Transparent Barrier Material) and into the matter, e.g., soil. This spreading is represented by a transfer function that can be found by mathematical normalization of a measured transmitted pulse (Sensing Sensor) to the measured received pulse. The frequency dispersion and the amount of spreading are themselves used as a measurement tool for the properties of both the Barrier Material and the Object through which the pulses are spreading outside of the Transparent Barrier Material. The EM properties of the Barrier Material are subtracted from the total signals received so that the EM properties of the Object can be isolated.

It is important to note that an Object in which these eddy currents are generated may be a separate Barrier Material located adjacent to the first saturated Barrier Material. One example is resistivity logging in a well through the production tubing, i.e., the first Barrier Material, to ascertain the properties of the reservoir through the well casing, a second Barrier Material. This example requires a device powerful enough to be capable of completely saturating the production tubing while only partially saturating the well casing, the second barrier. The conductivity and permeability of the second Barrier Material may be determined by varying the saturation current from zero to full saturation while noting the current at the receiver. The conductivity can be determined by varying the frequency at the fixed permeability value.

The orientation of the Transmitter and Receiver is important with respect to the axis of the Magnetic Culminator saturating coil, the object to be measured, and the distance to the Object. Additional advantages and modification will readily occur to those skilled in the art. The invention in its broader aspects is therefore not limited to the specific details, representative apparatus, and the illustrative examples shown and described herein. Accordingly, departures may be made from the details without departing from the spirit or scope of the disclosed general inventive concept.

Many uses exist for the ability to send an EM wave through a Barrier Material in order to measure EM properties of Objects on the other side. Examples are measuring the levels of water or liquids having a magnetic moment or are slightly conductive. These include but are not limited to liquid hydrocarbons, saline solutions and alcohols. These uses can include but are not limited to measurement through a storage tank wall comprised of a Barrier Material, detection of water and other such liquids having a magnetic moment or are slightly conductive in a pipeline also comprised of a Barrier Material, through casing (another Barrier Material) resistivity measurements in an oil or gas well, corrosion detection inside storage containers, and many others. Reducing permeability by magnetic saturation is well known. Others have unsuccessfully attempted to use saturating currents to reduce the permeability of the ferromagnetic casing material for oil well logging using only fixed geometry, time invariant saturation. The production tubing must be removed and the transmitter and receiver must be in the same saturated area. (See U.S. Pat. No. 5,038,107). The principles discussed herein, however, may be combined with other embodiments and modifications to utilize Barrier Material, e.g., ferromagnetic metal, may be itself used to enhance the measurement.

This will be done by (1) different degrees of saturation that can (2) vary spatially and (3) temporally with (4) transmitter-receiver in separate saturated zones (5) which are nulled electronically. These variations can create magnetic flux concentrations as in a lens.

It has been determined that there are four (4) important factors in the system design of this invention. These factors are as follows:

1. Design of the Transparency volume region.
2. Possible spatial distributions and locations of the Magnetic Transparencies.
3. Possible temporal variations in opening and closing the Magnetic Transparency.
4. Nulling techniques to eliminate direct signal coupling between the Transmitters and Receivers.

Each of these will be discussed below.

1. Design of the Magnetic Transparency:

There are three (3) aspects to the magnetic transparency design.

These are:
(a) Method of design for saturation or partial saturation for creating a Magnetic Transparency.
(b) Geometric considerations of magnetic transparency size to Receiver or Transmitter location within the magnetic transparency. The Magnetic Transparency Generator device and the flux circuit, which includes the target at which Transparency is desired, can only achieve saturation at the point of desired transparency. Thus, $$(\text{Vol})(\text{permeability})_{MC} >> (\text{Vol})(\text{permeability})_{Target} + (\text{Vol})(\text{permeability})_{gaps}$$

where "MC" is the Magnetic Culminator of the Magnetic Transparency Generator device subject of this invention. It is preferred that any gaps (e.g. air gaps) should be small with respect to the Magnetic Culminator diameter or the pole of Flux Circuit Core emitting the Transparency Current if a Magnetic Culminator is not used. This will include any Magnetic Culminator utilized in the MTG (c) The local flux density at any location of the Flux Circuit Core must be less than the local saturation value at that location.

$$(\text{Vol})(\text{permeability})_{FCC} >> (\text{Magnetic Flux Density})_{FCC}$$

where "FCC" is the cross sectional area of any specific location in the Flux Circuit Core of the Magnetic Transparency Generator.

1(a). Method of design for saturation or partial saturation for creating a magnetic transparency:

With respect to full or partial saturation, the volume of the Barrier Material intended to be saturated must be multiplied by the permeability of the Barrier Material. Then, the product of Magnetic Culminator volume multiplied by its permeability must be calculated. (If a Magnetic Culminator is not utilized, the volume of the magnetic pole must be calculated and multiplied by the permeability of the pole. The resulting product for the Magnetic Culminator (or alternately the Magnetic Culminator) must be greater than the sum of products for the intended Transparency volume region and any gap. Such a gap may comprise air or materials such as coatings, (including but not limited to insulating materials, paint, cement around carbon steel re-bar) or other Barrier Materials. This relationship is required for the magnetic flux to be contained and guided to the targeted portion of the Barrier Material intended to be saturated. Alternatively stated, the product of the volume and permeability of the inducer must be greater than the product of the volume and permeability of the transparency region.

When it is the objective to transmit and receive a Sensing Signal through the Barrier Material in order that the measurements be made of Objects on the other side of the Barrier Material, it is preferred that the volume of the area outside of the EM Barrier significantly exceed the Transparency volume region. This volume relationship is preferred in order that the electromagnetic properties of the Object outside the Barrier Material dominate the received percentage signal and also from the Barrier Material for maintaining a high signal to noise ratio. Alternately stated, it is intended that the received signal not be significantly influenced by variations in the electrical or physical properties of the Transparency volume region. Changes in the properties of the Barrier Material that can impact the received signal include but are not limited to variations in thickness, density, corrosion, welds, composition of material.

Figure 4A:
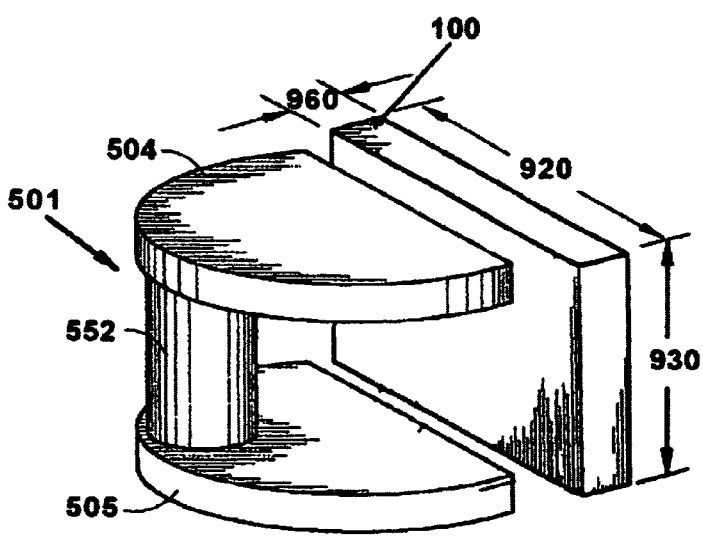
FIG. 4A illustrates one embodiment a Flux Circuit Core component of the invention.
Figure 4B:
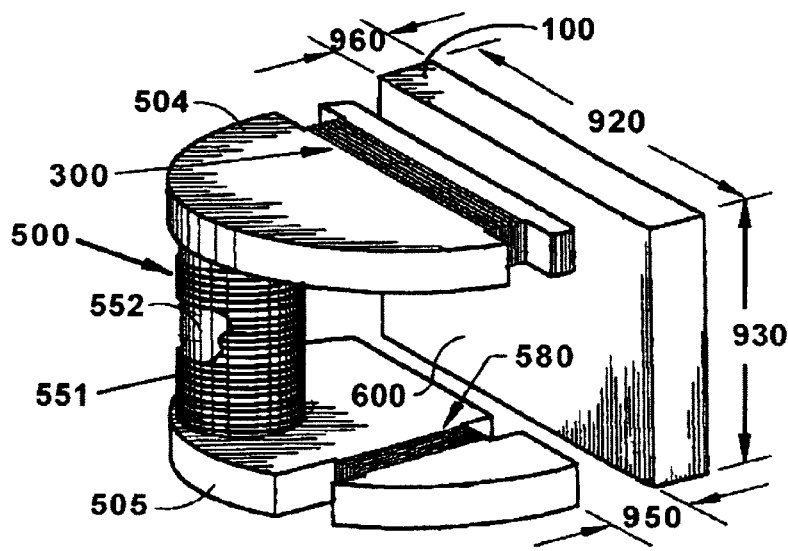
FIG. 4B illustrates a configuration of the magnetic signal Receiver and the Transmitter on the Flux Circuit Core shown in FIG. 4A

FIG. 4A illustrates the Flux Circuit Core of one embodiment of the MTG used to generate the Transparency Current required in practicing the present invention, and particularly, for containing flux lines to completely saturate the intended Barrier Material volume region. FIG. 4B illustrates one embodiment of the Flux Circuit Core 501 for use with the present invention. The FCC 501 comprises a top flange 504, a bottom flange 505 and a core 552. The core 552, upon which the coils of the electromagnet are wrapped, is located between the top flange 504 and bottom 505. The tank wall comprises the Barrier Material 100. The complete Magnetic Transparency Generator incorporates the Flux Circuit Core 501 provides a Transparent volume region that is illustrated having a width "920", a height "930" and a thickness "960." This Barrier Region volume region may be termed the Target Material.

FIG. 4B illustrates one embodiment of a mono-static application of a Magnetic Transparency Generator 500. The power source, display and other components are not shown. Note that the Transmitter 300, Receiver 580 and Transparency Coil 551 are all geometrically nulled to each other. The Target Material 600 comprises the volume dimensions 920, 930 and 960. An air gap 950 separating the MTG from the EM Barrier is also shown. As used herein, mono-static embodiment comprises an MTG containing both one or more Transmitters and one or more Receivers.

Figure 4C:
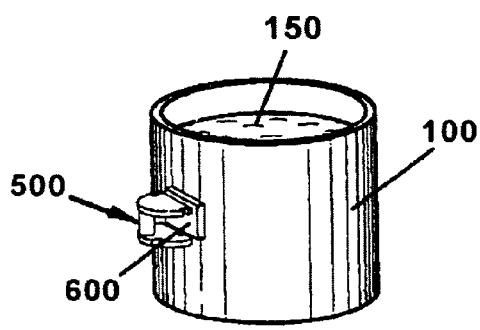
FIG. 4C illustrates the placement of a Magnetic Transparency Device on the outside of a storage tank made of a Barrier Material.

FIG. 4C illustrates a mono-static embodiment of a Magnetic Transparency Generator 500 placed upon the outer wall of a storage tank 100. The storage tank wall consists of an EM Barrier and the tank contains a volume of an electrically conductive liquid or other substance 150. It will be appreciated that the Target Material 600 depicted in FIG. 4C is part of the Tank 100 and not a component of the MTG 500.

Figure 4D:
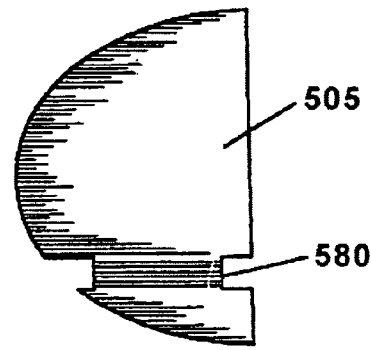
FIG. 4D illustrates a configuration of a receiver on part of Flux Circuit Core of the present invention.

FIG. 4D illustrates a method of placing a coil onto a portion of the MTG. It will be appreciated that the coil will preferably be a Receiver Coil 580 or a Transmitter Coil, not shown. Further, it will be appreciated that the flange 505 of the MTG will comprise one of the magnetic poles when the Transparency Coil is activated "on." This flange will comprise a region of relatively high flux density. The placement of the coil in this location will enhance its capability to send or receive oscillating magnetic signals into or through the Target Material.

1(b). Geometric considerations of transmitter-receiver location with respect to the magnetic transparency.

The geometric considerations of Transmitter-Receiver location with respect to the Transparency volume region means that, depending upon whether it is through-tank level gauging or through-well casing logging or some other application, the location of the Transmitter-Receiver may vary. See FIGS. 4C, 5, 6, 7A–C, 8, 9A, 11A–C, 12, 13, 14A and 14B, for examples. Therefore, by riot wrapping either the Transmitter or Receiver coils (or both) around the Magnetic Culminator or magnetic pole of the Flux Circuit Core, inducing the Transparency Current provides a number of advantages, including but not limited to:

1. Mechanical nulling by Receiver or Transmitter placement or rotation with respect to each other, or with respect to Material.

2. Directionality by the Transmitter or Receiver being nearest tank side of core, or by rotation of the axis of the Transmitter or the Receiver to obtain the geometric null.

3. Minimization of potential saturation of the Magnetic Culminator or magnetic pole and allowing uncontrolled dispersion of magnetic field lines. However, there are applications of partial saturation wherein it may be desirable to take walls out of total saturation. This is exactly opposite the concern from cited U.S. Pat. No. 5,038,107 which does not want to use an AC current on the core since that may take the walls or core out of saturation.

4. Since the Transmitter coil can have an air core, laminated core or smaller inductor core than the Magnetic Culminator or the magnetic pole core, much higher frequencies can be used since the inductive impedance due to the presence of a large metallic core drives up the total impedance to the Transmitter signal.

5. Multiple transmitters, each at varying frequencies, may be used broadcasting simultaneously to perform spectroscopy over a large frequency range.

6. In the same fully saturated Transparency volume region, Transmitter coils of different lengths will have different field lines and can therefore penetrate the surrounding media by the coil length for profiling the near media.

7. For the case of full saturation, the Transparency volume region to be saturated needs to encompass some portion of the. Transmitter or Receiver. Otherwise, a large amount of the Sensing Signal or signal for the Receiver is absorbed into the non-Transparent area of the Barrier Material. This concept is shown in FIG. 10.

8. Multiple Transmitters can be used to "buck" each other so as to push flux lines of the Sensing Signal far out into the surrounding environment.

9. Multiple receivers can be either nulled with respect to each other and/or built into an array for improving signal receiving resolution.

Figure 5:
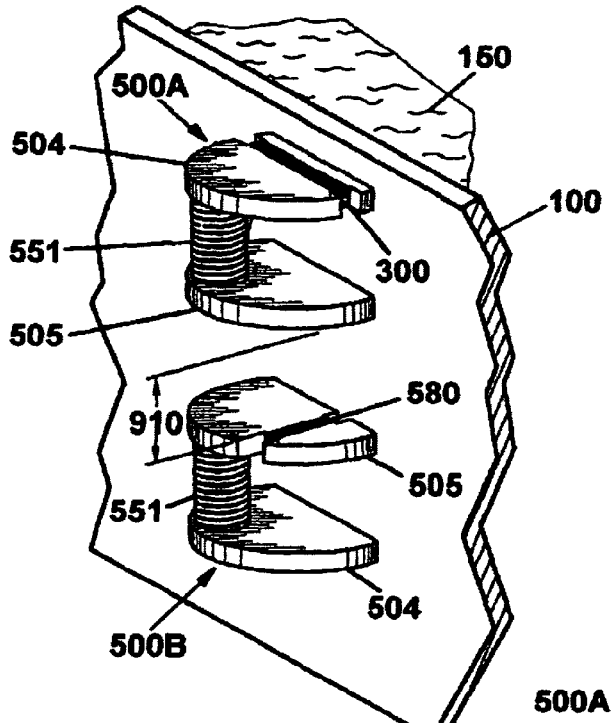
FIG. 5 illustrates the Transmitter of the present invention separate from the signal Receiver.

FIG. 5 is an illustration of one embodiment of a Sensing Signal Transmitter and signal Receiver configuration used in practicing the present invention. The Magnetic Flux Generators 500A and 500B are Magnetically coupled with tank wall 100. The Transmitter-Receiver orientation being one-above-the-other provides effective use of the present invention for through-tank determination of fluid levels and many other applications. The separation between the Transmitter and Receiver is indicated by 910. The separation 910 acts as a null since the interceding EM Barrier Material 100 comprising the structure of the tank wall is not saturated. Therefore, this portion of the tank wall absorbs magnetic energy emitted from the Sensing Signal Transmitter. Accordingly, the signal Receiver will not receive signals directly from the Transmitter, but rather only magnetic energy generated by induced eddy currents in Objects inside the tank. Also, the Receiver coil 580 is rotated at an orientation 90° to that of the Transmitter 300. This geometric or spatial configuration also acts as an additional geometric null to direct the Transmitter-Receiver Coupling.

Figure 6:
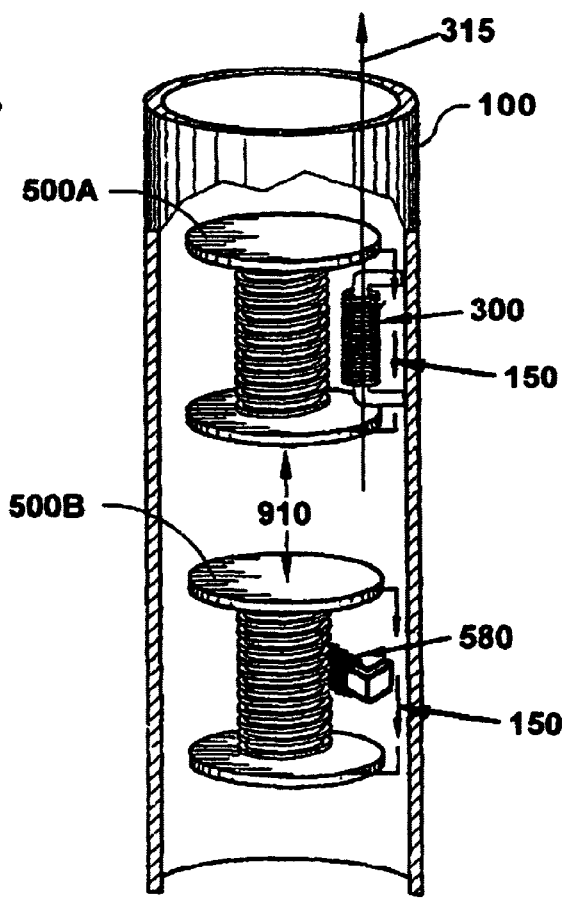
FIG. 6 illustrates a Transmitter and the separate signal Receiver of the present invention inside a well casing or pipe.

FIG. 6 is another embodiment of the present invention for use with well logging through a casing comprising a Barrier Material. FIG. 6 illustrates two MTGs 500A, and 500B displaced by distance 910 within the Barrier Material 100. The Sensing Signal Transmitter 300 and the MTG 500 are similarly orientated and an off-core receiver 580 is rotated 90° from the Transmitter Coil axis 315. Each MTG contains a Transmitter 300 or Receiver 580 but not both. This is an example of a bi-static embodiment of the invention.

Figure 7A:
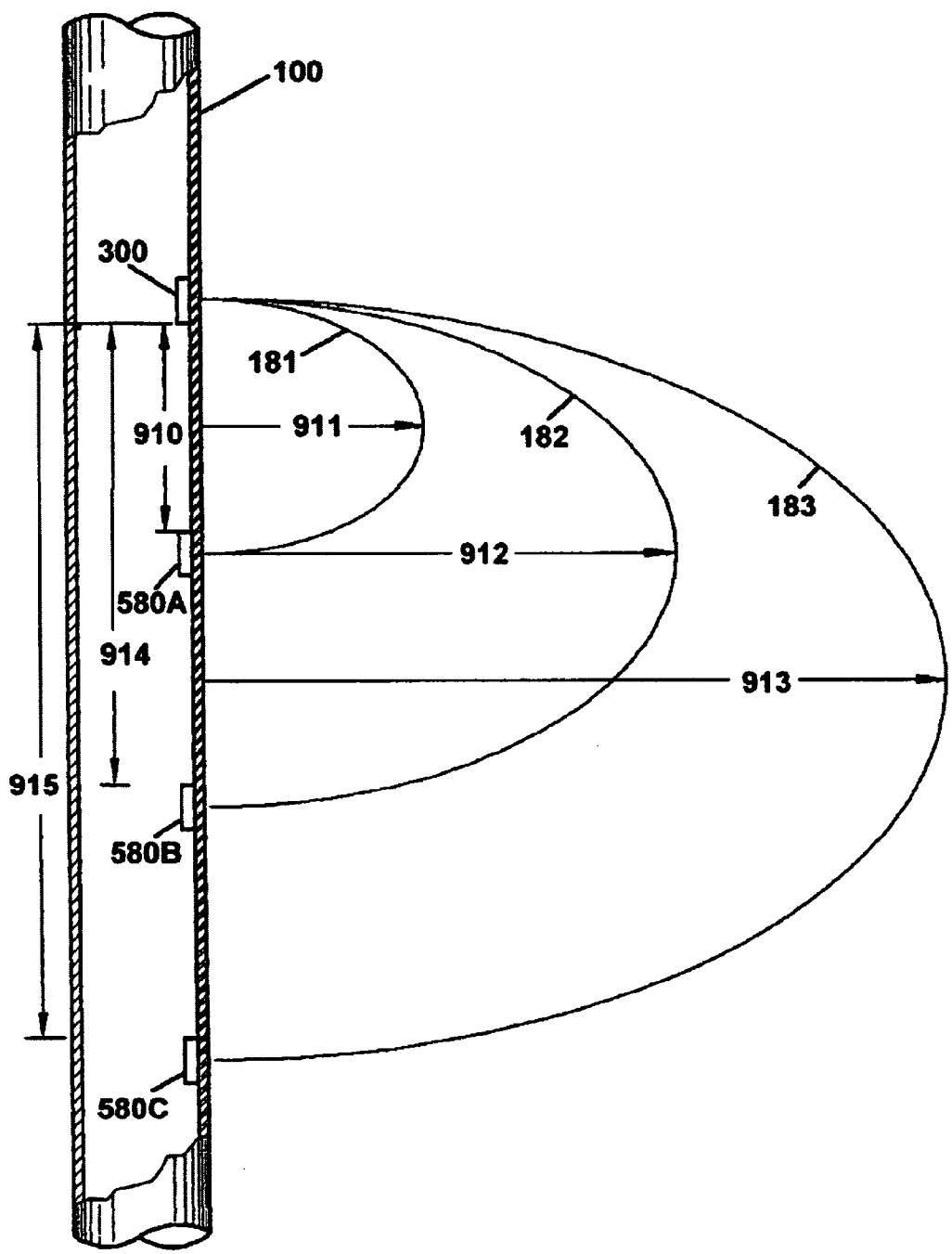
FIG. 7A illustrates a plurality of separate signal Receivers in relation to a separate Transmitter.

FIG. 7A illustrates another embodiment utilizing multiple Receivers 580A, 580B, and 580C built into an array for improving signal resolution or detection of signals from Objects a varying distances from the Barrier Material. The Transmitter 300 and Receiver 580A, 580B and 580C may each be incorporated as components of separate Magnetic Transparency Generators (not shown). Within the range of distance not exceeding 5 times the diameter of the Transmitter Coil (not shown), i.e., near field to the Transmitter, Objects a varying distances within the near field can be detected by a single Transmitter Signal by measuring the return signals detected alternatively by Receivers 580A, 580B, and 580C.

Within the near field, the distance of preferred signal reception will be a function of the distance of the Receiver from the Transmitter. This relationship is illustrated by Receiver 580C, located a distance 915 from Transmitter 300 detecting induced Magnetic signals at a distance of 913. It will be appreciated that the separate MTG's will create relatively small Transparencies in the Barrier Material 100. The unsaturated portions of the Barrier Material will null the direct transmission of the Transmitter Signal to the Receivers. The relatively small Transparencies also reduce the energy requirements of the invention.

Figure 7B:
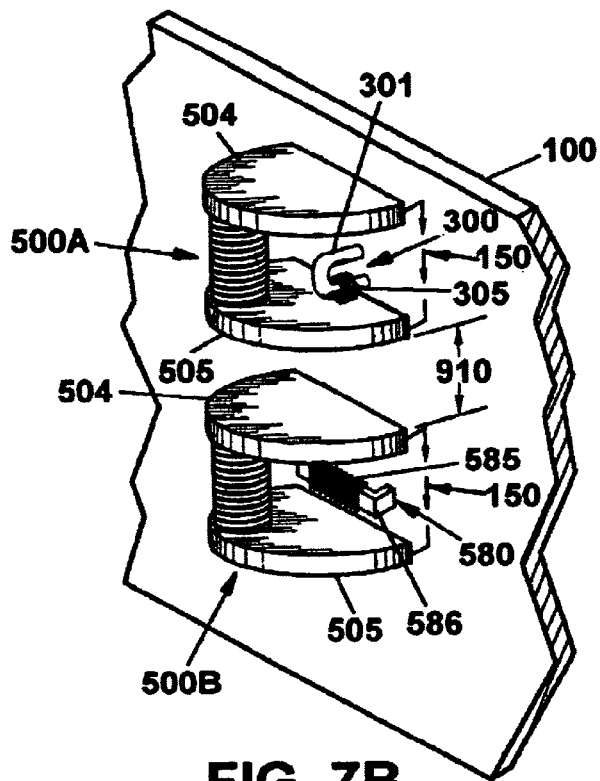
FIG. 7B illustrates another embodiment the oscillating magnetic signal Transmitter separate from the signal Receiver.

The arrangement illustrated in FIG. 7B provides for a non-saturated section of the wall 100 to be between the MTG's 500A and 500B. It will be appreciated that the magnetic field lines 150 are broken in the drawings only for maintaining the clarity of the drawings. It is understood that the field lines are, in fact, continuous. Not that the field lines of each MTG are coupled with separate volume regions of the Barrier Material. This coupling creates the Transparency utilized by the Transmitter and Receiver.

Figure 7C:
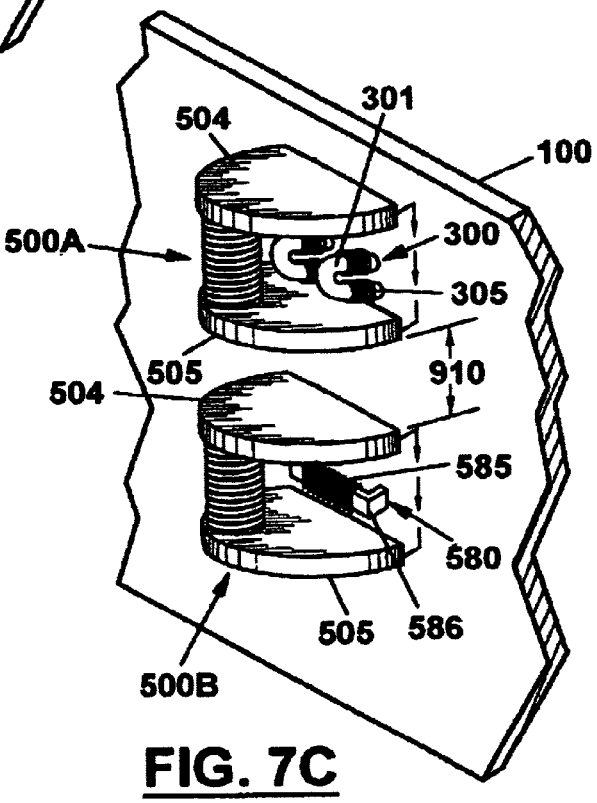
FIG. 7C illustrates another embodiment with multiple Transmitter Coils.

FIG. 7C illustrates another bi-static embodiment of the invention wherein the MTG 500A contains a plurality of Transmitters 300.

Figure 8:
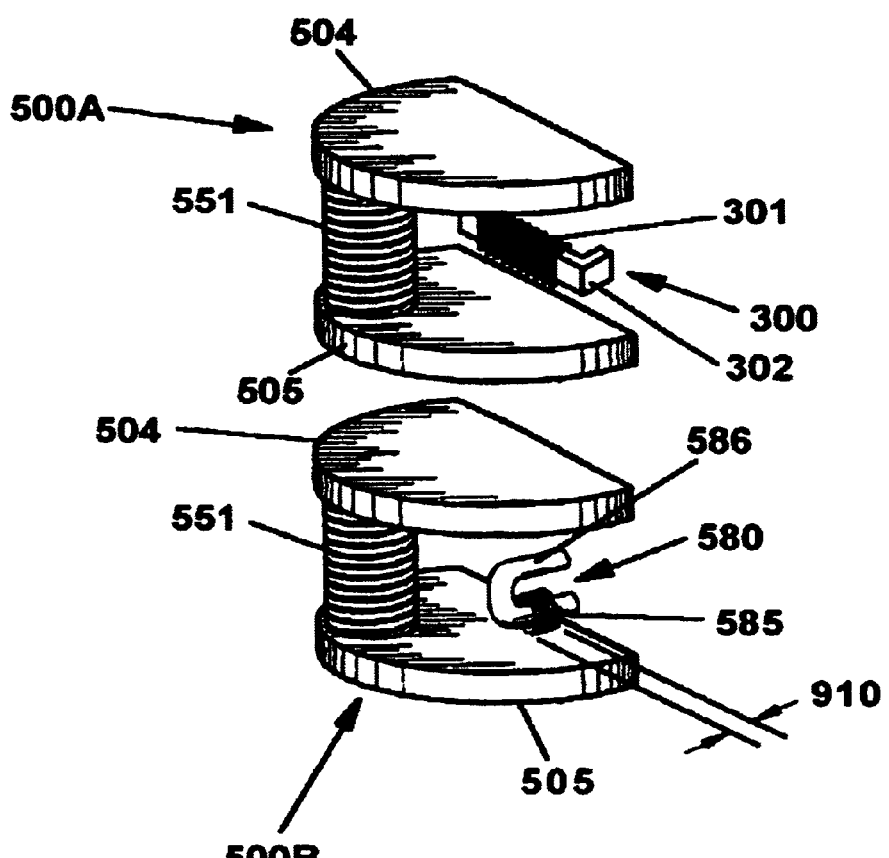
FIG. 8 illustrates another embodiment of the separate oscillating magnetic signal Transmitter and the signal Receiver.

FIG. 8 illustrates the orientation of a first MTG 500A and second MTG 500B in the associated saturation coil 551 and Transmitter coils 300. The Transmitter coil 301 and the receiver coil 585 are oriented to be 90° with respect to the MTG coils 551. This is also a bi-static embodiment of the invention.

FIG. 9A illustrates the concept of utilizing Transmitter Coils 305 of variable lengths within the same Transparency Volume Region. Three separate Transmitters 300A, 300B and 300C are placed within a Magnetic Transparency Generator 500. The MTG is placed inside a well casing. FIG. 9B illustrates that the separate Transmitter Coils can be converted by closing switches 562A and 562B into a single Transmitter coil having the combined length of 940+941+ 942. Note that the Transmitter Core 301 may also be increased by the closing of connections 302A and 302B. It will be noted that additional segments may be used as well as a single combination of 300A and 300B without utilizing 300C. It will be also noted that FIG. 9A does not show the Receiver or Transmitter Coil for the MTG. In FIG. 9A, the well casing penetration example is used but the technique is equivalent for through tank level gauging, pipelines and other related cases.

2. Possible Spatial Distributions and Locations of the Magnetic Transparency Each different application for various problems will have a unique spatial distribution of the Magnetic Transparency. A few of those many possible are shown in FIGS. 10, 11, 12, 13 and 14. Therefore, any geometrical combination of transmitters and receivers may be used. Directionality is achieved by creating a transparency in front of different transmitters and receiver combinations, either to transmit directionally, receive directionally or perform both with transmitters combined with various receivers.

The unsaturated sections that are turned off provide excellent signal damping and nulling for the receiver or transmitter. These time variations of the transparency are discussed herein.

Figure 10A:
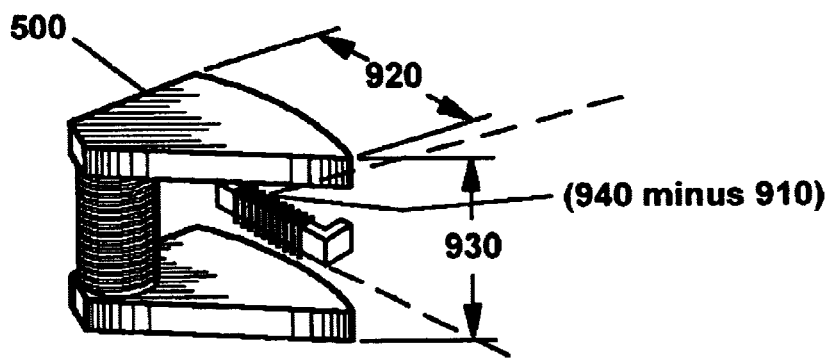
FIGS. 10A and 10B illustrate the geometry of field considerations for placement and size of the Transmitter in relation to the area of the volume region to be saturated.
Figure 10B:
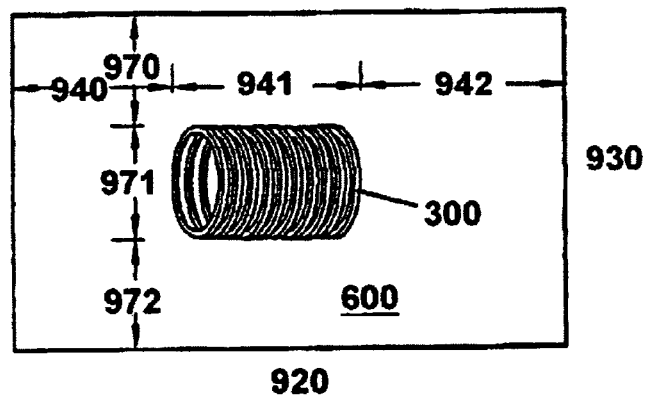

FIGS. 10A and 10B illustrate embodiments of the invention that utilize the placement of the Transmitter 300 in the center of the Transparency or Partial Transparency volume region of the Target Material 600. The Target Material has a width 920 and a height 930. It will also be appreciated that this may be utilized with a receiver (not shown). It will also be appreciated that placement of the Transmitter in the geometric center of the area that is Partially Transparent will optimize the symmetry or provide other benefits in regard to the Magnetic Antenna or Magnetic Lensing effect.

Figure 11A:
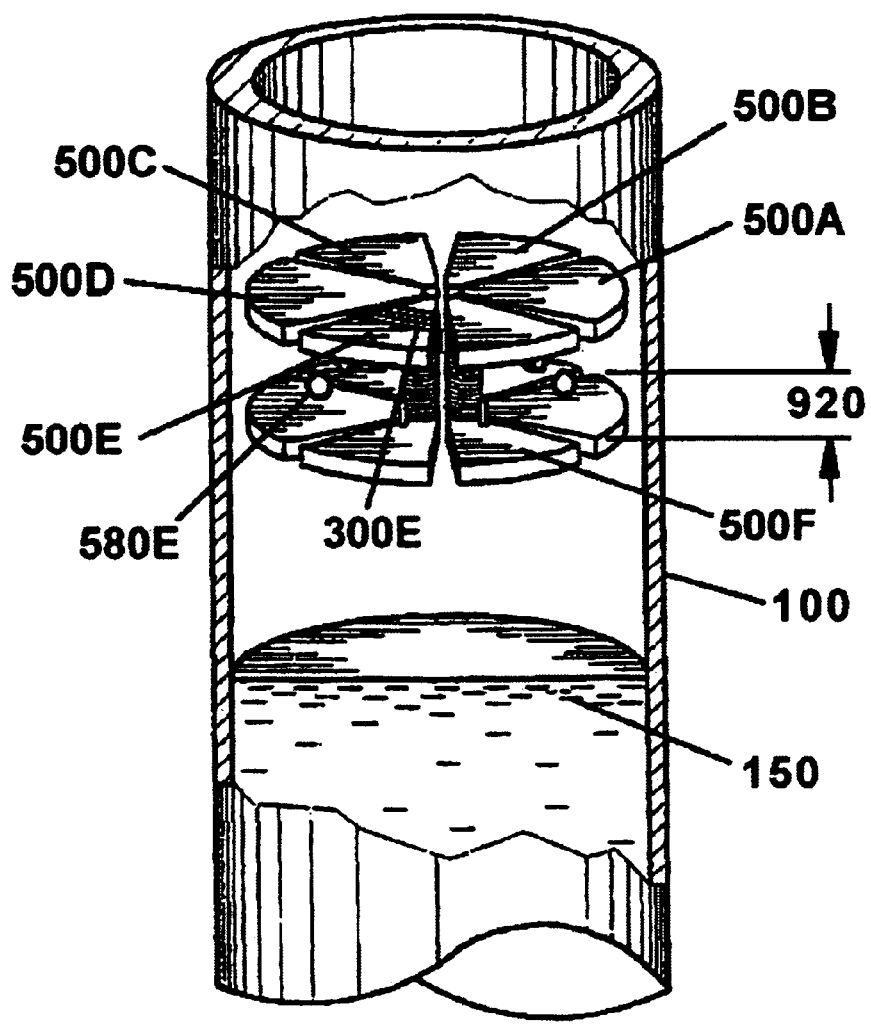
FIGS. 11A, 11B, 11C and 11D illustrate examples of various embodiments of the present invention for directional measurement.

FIG. 11A is an example of one embodiment of the present invention for directional measurements, such as logging to find resistivity of cement around a casing or from within the interior of a Barrier Material such as a pipe or shaft. FIG. 11 illustrates the use of Transmitter-Receiver pairs geometrically nulled by 90° rotation in a magnetically saturated section. Note that only the Transmitter-Receiver pair on MTG 500E is shown. The Transmitter 300E is wrapped around the top flange of MTG 500E in a manner similar to that depicted in FIG. 4B. The Receiver 580E is nulled 90° to the Transmitter.

It will be appreciated that each MTG may be activated sequentially to allow measurements to be taken in all directions with minimum consumption of power. Also, since the MTG is not in contact with the wall of the Barrier Material 100, the device may be moved along the length of the Barrier Material.

Figure 11B:
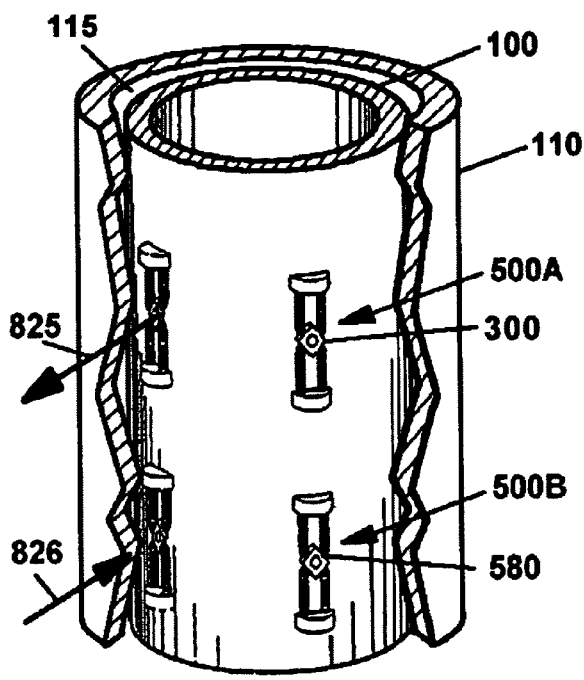

FIG. 11B illustrates a bi-static embodiment of the invention wherein multiple Transmitter-Receiver pairs are placed between production tubing 100 and well casing 110. Each Transmitter and each Receiver utilizes a separate MTG. This is shown for MTG 500A incorporating Transmitter 300 and MTG 500B incorporating Receiver 580. The MTG's are oriented to produce Transparencies (or Partial Transparencies if desired) into or through the well casing 110. This direction of transmitting out of the well casing is shown by vector 825 and the receipt of resulting signals by the vector 826.

Figure 11C:
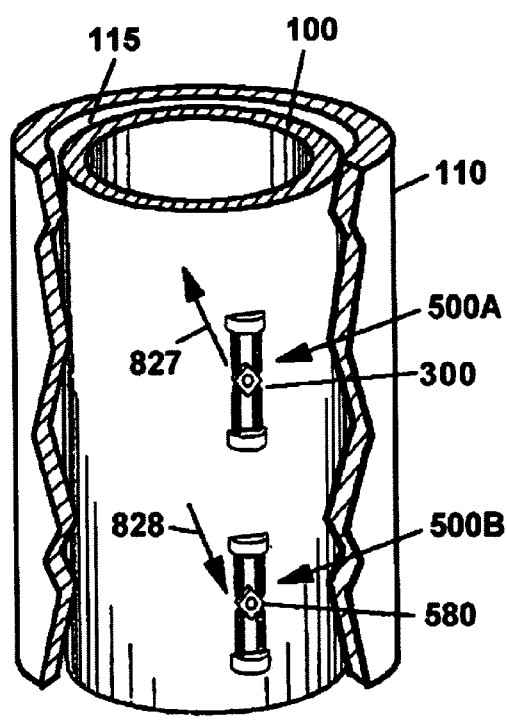

FIG. 11C illustrates a similar bi-static application but where the Transmitter 300 in MTG 500A is sending an oscillating magnetic signal into the production tubing. This is represented by vector 827. The responding signal is received by the Receiver 580 located on MTG 500B. This is represented by vector 828. It will be appreciated that the Transmitter would be located on the inside of the MTG 500A next to the Production Tubing Wall 100. The Receiver would also be located next to the Production Tubing Wall and geometrically nulled to the Transmitter.

Figure 11D:
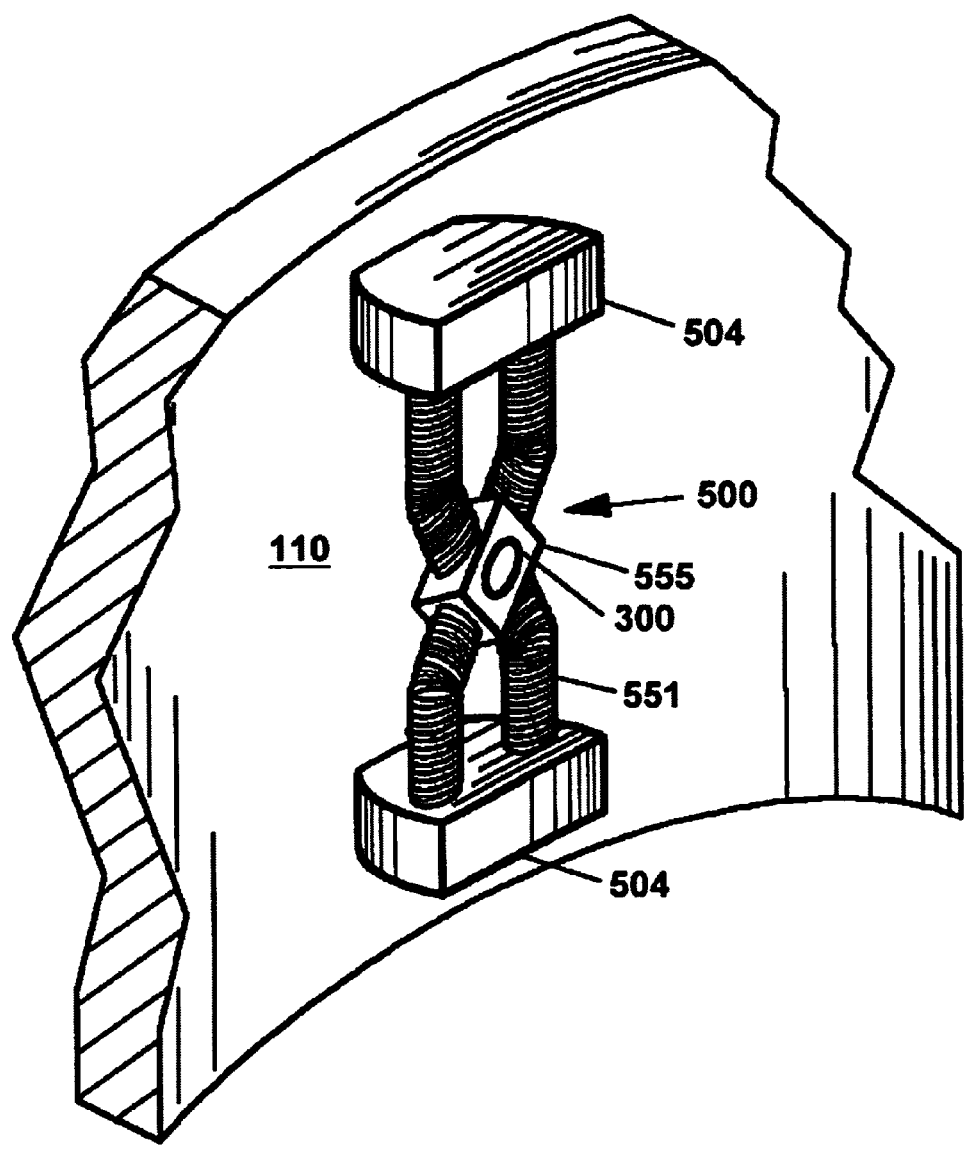

FIG. 11D shows the MTG containing the Transmitter of FIG. 11B. Note that a Magnetic Culminator 555 is utilized to increase the energy efficiently of the MTG. The two flanges 504 are magnetic poles of opposite polarity to the Magnetic Culminator. It will be appreciated that the Transmitter 300 would be preferably located on the opposite side of the Culminator and adjacent to the wall of the well casing 110.

Figure 12:
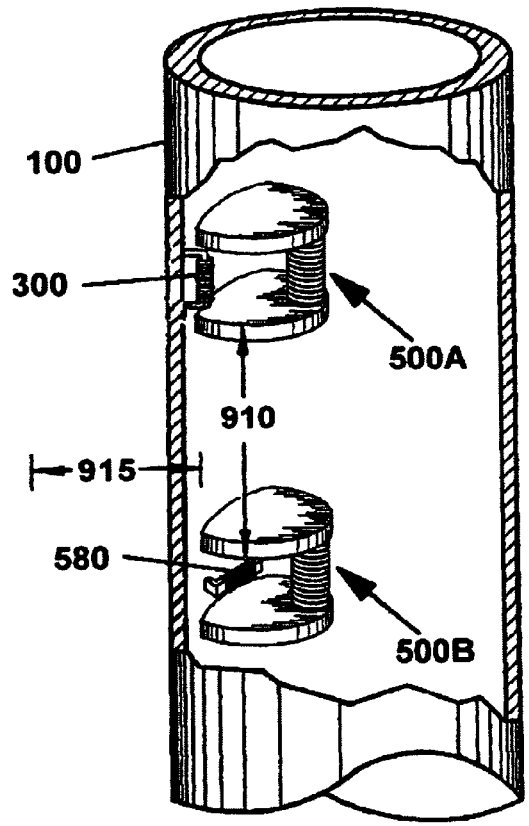
FIG. 12 is yet another embodiment of the present invention illustrating the use of the invention for profile logging with a separated Transmitter and Receiver.

FIG. 12 is yet another bi-static embodiment of the present invention illustrating the use of the invention for profile logging with separated transmitter and receiver incorporated into individual MTG's 500A and 500B. Note that this embodiment does not utilize a Magnetic Culminator. Note also that the effective signal penetration 915 will be a function of the distance 910 between 500A and 500B, as well as the length of the Transmitter coil 300. It will be appreciated that the Transmitter 300 and the Receiver 580 are components of the MTG 500A and 500B respectively and not attached to the Barrier Material 100.

Figure 13:
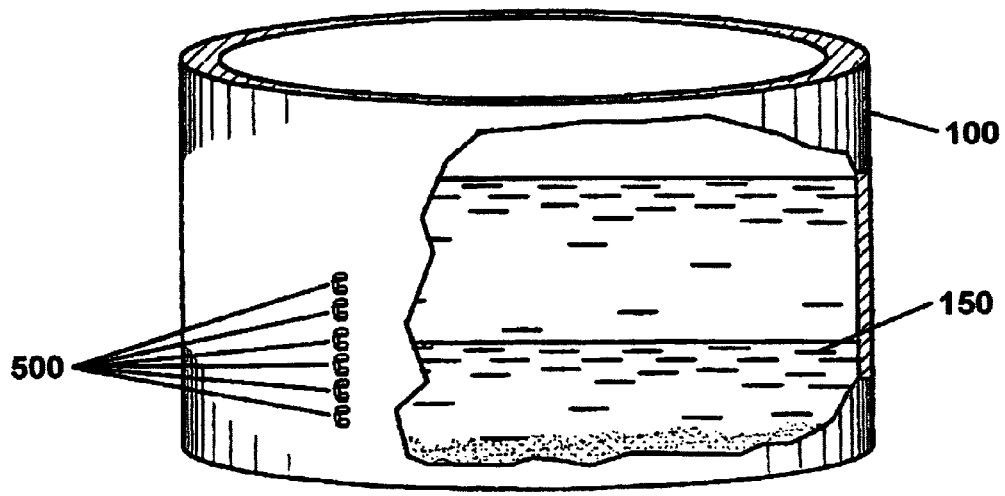
FIG. 13 illustrates another application of the present invention associated with the measurement of sediment and water in a storage tank.

FIG. 13 illustrates another application of the present invention associated with the measurement of sediment and water in a storage tank illustrating the placement of a plurality of MTG devices, each containing transmitter-receiver pairs on the outside of the tank for measuring sediment and water.

Figure 14A:
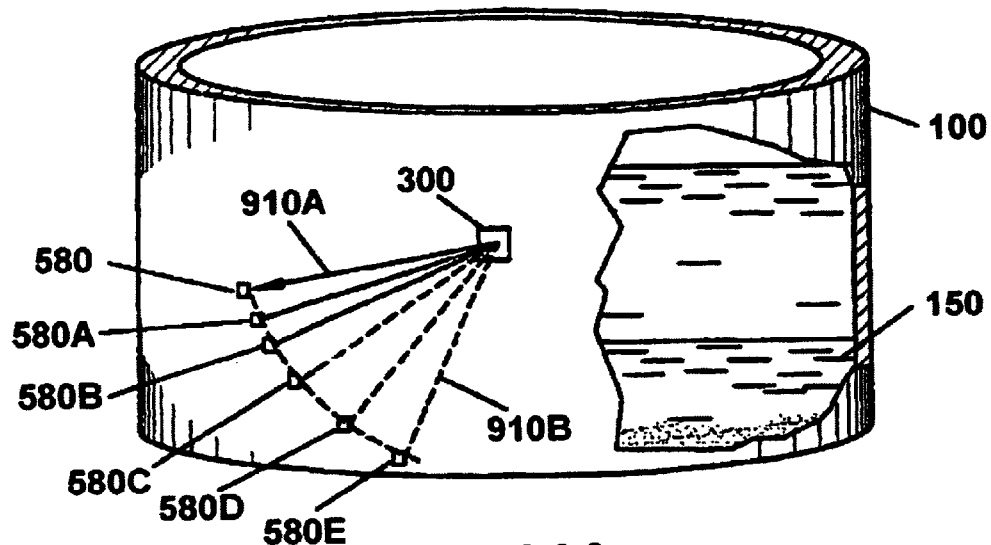
FIG. 14A illustrates yet another embodiment of the present invention for the measurement of sediment and water wherein the Transmitter is in association with a polarity of fixed receivers at equal distances from the Transmitter and located outside the tank such that resistivities change as the Transmitter/Receiver signal changes.

FIG. 14A illustrates yet another embodiment of the present invention utilizing a bi-static array with a single Transmitter 300 and multiple Receivers 580–580E for the measurement of sediment and water. The Transmitter is in association with a plurality of fixed Receivers at equal distances from the Transmitter and located outside the tank such that resistivities change as the Transmitter-Receiver signal changes.

Figure 14B:
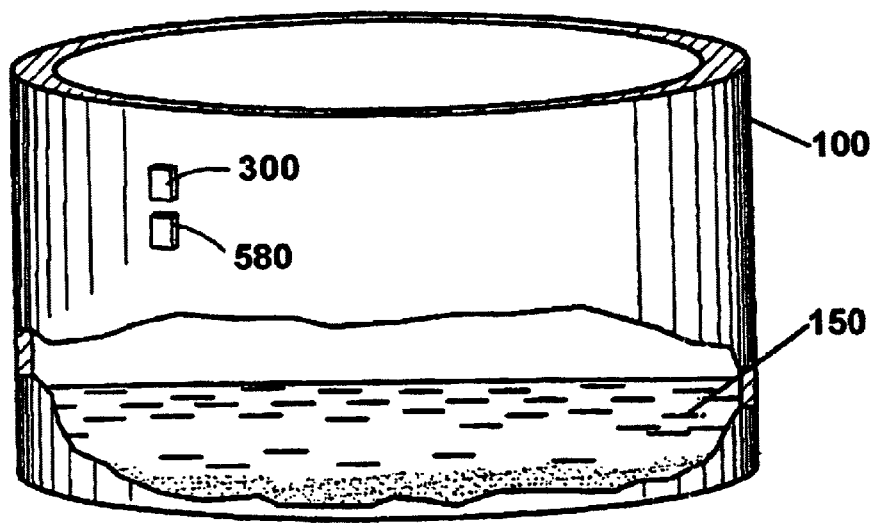
FIG. 14B illustrates yet another embodiment of the present invention for the placement of Transmitter/Receiver pairs on the outside of the tank for measuring sediment and water used as a switch.

FIG. 14B illustrates a bi-static array for a switch. The Magnetic Transparency Generators are not shown.

Figure 15:
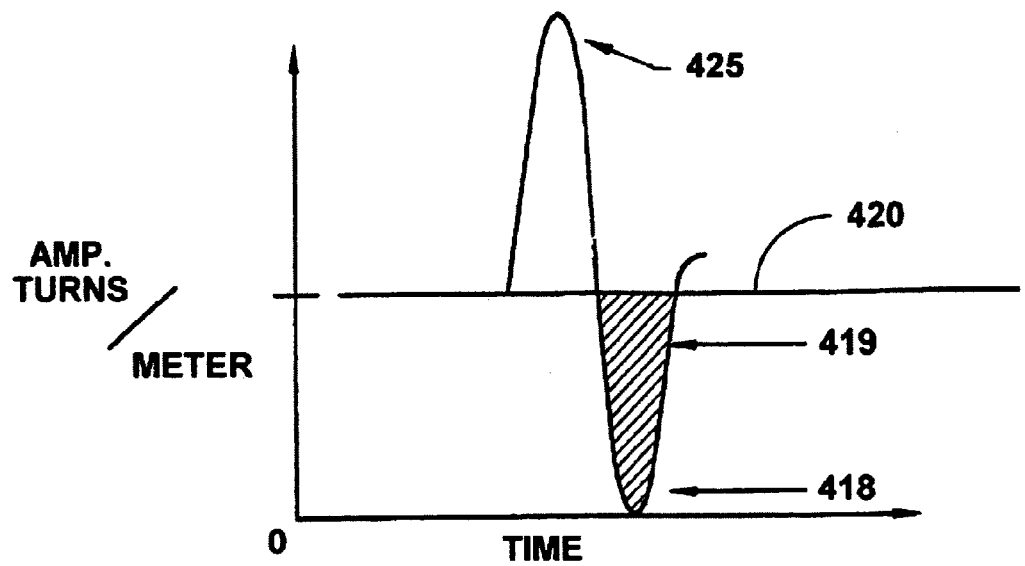
FIG. 15 illustrates the use of a damping AC signal upon the saturation current for steel casing.

FIG. 15 illustrates the use of an oscillating EM signal 419 for damping the saturation current 420. The damping effect is shown at 418 and occurs within the shaded area. The damping can cause the Transparency to close or create only a Partial Transparency. In this manner, the oscillating wave can act as a switch turning the Transparency "on and off". It will also appreciated that this varying of saturation of the volume region may be utilized with Magnetic Lensing or Magnetic Antenna capabilities. It will also be appreciated that at 425, the Transparency may be open and the oscillating signal 419 will be transmitted across the Barrier Material.

Figure 16A:
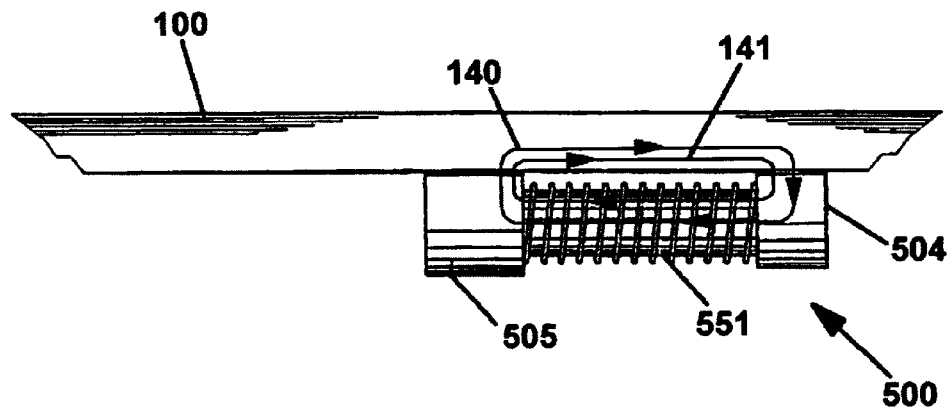
FIG. 16A is a one-dimensional device of the present invention for coupling a magnetic field to the surface of a Barrier Material.

FIG. 16A is a one-dimensional Magnetic Transparency Generator device 500 of the present invention. The one-dimensional MTG 500 has magnetic flux lines 140 and 141, pole orientations "N" 505 and "S" 504. It is of course recognized that the pole orientations may be switched without a change in the subject invention. The MTG may couple to the Barrier Material 100. It is also noted that most, if not all, of the magnetic flux will shift to the side of the MTG adjacent to the EM Barrier.

Figure 16B:
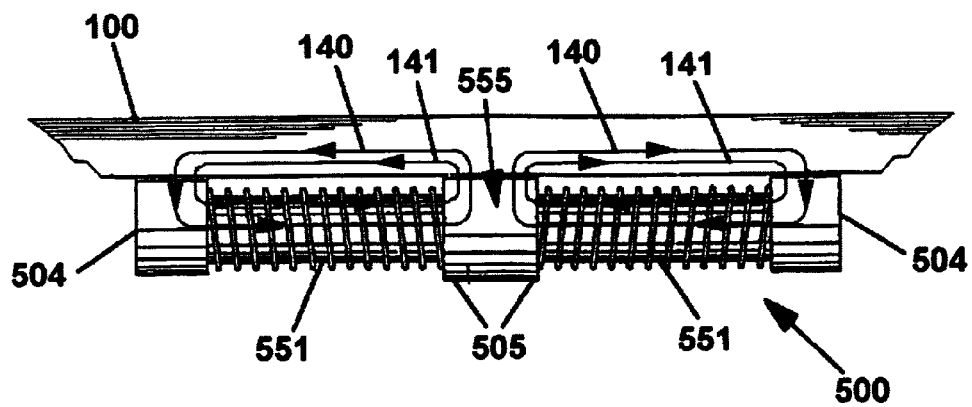
FIG. 16B is an alternate one-dimensional device of the present invention containing a Magnetic Culminator.

FIG. 16B is another embodiment of a one-dimensional Magnetic Transparency Generator 500 but having two cores 551 and south poles 504. The two north poles 505 are combined together into a Magnetic Culminator 555.

Figure 17:
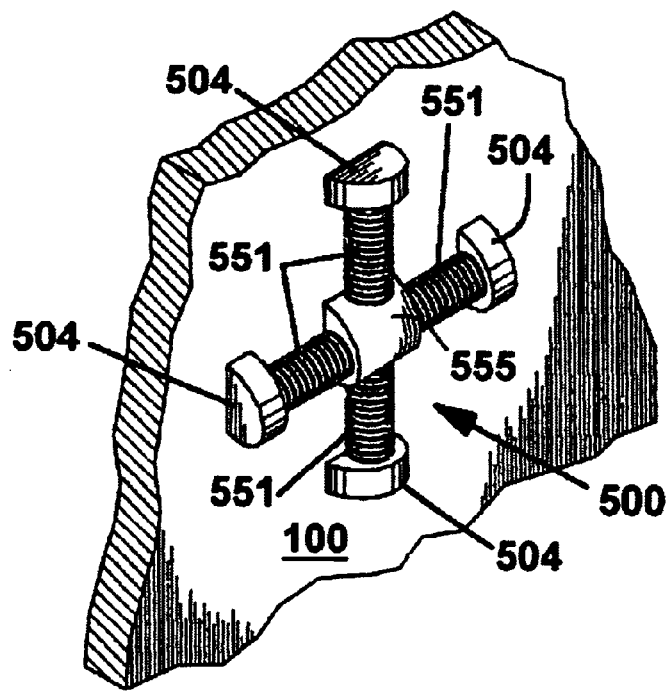
FIG. 17 is a two-dimensional cross-flux Magnetic Culminator of the present invention.

FIG. 17 is a two-dimensional Cross-Flux Magnetic Transparency Generator device 500 of the present invention. The two-dimensional cross-flux MTG 500 is adjacent to a Barrier Material 100. The 4 like poles 504 are connected to four separate cores 551. The opposing magnetic poles are contained within a single mass or Magnetic Culminator 555.

Figure 18:
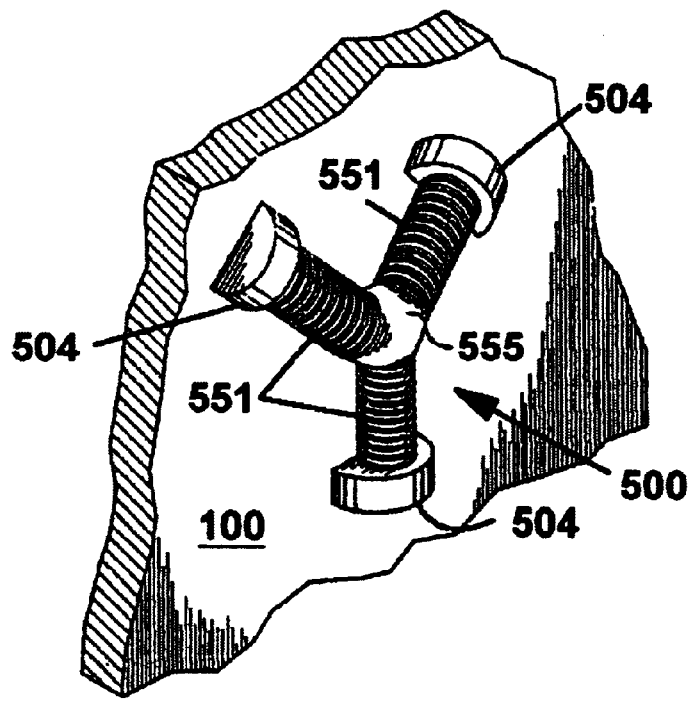
FIG. 18 is a two-dimensional star-flux Magnetic Culminator of the present invention.
Figure 19:
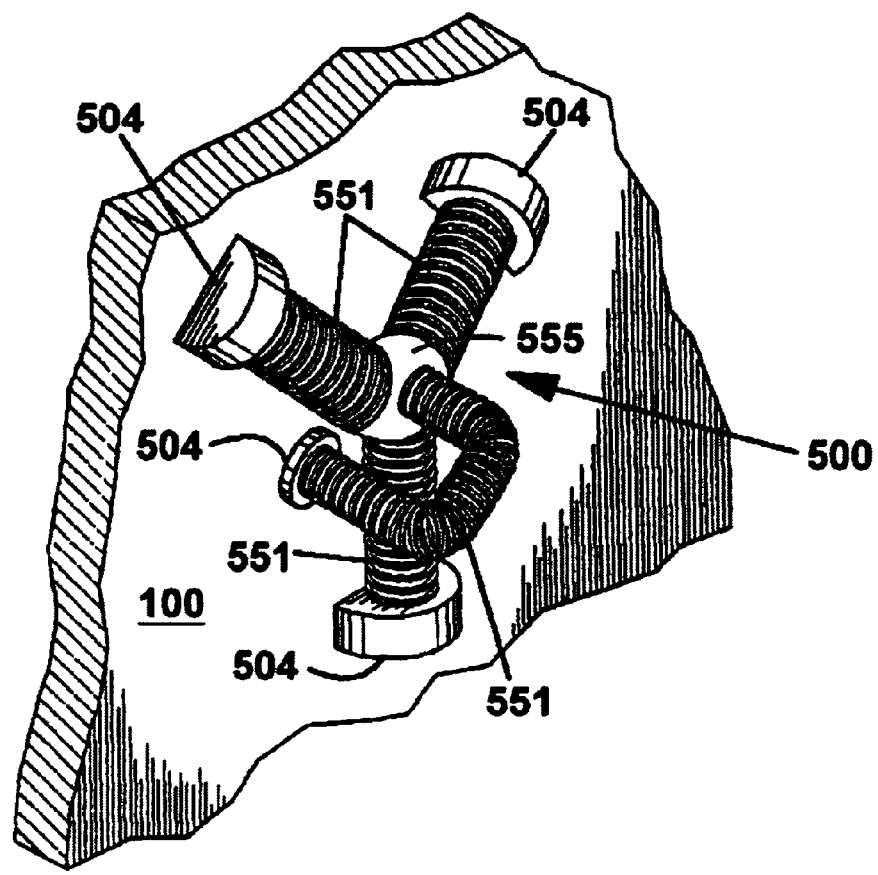
FIG. 19 is a three-dimensional star-flux Magnetic Culminator of the present invention.

FIG. 18 is a two-dimensional star-flux Magnetic Transparency Generator device 500 of the present invention. The two-dimensional MTG device 500 is adjacent to the Barrier Material 100. FIG. 19 is a three-dimensional Star-flux Magnetic Transparency Generator device 500 of the present invention. The three-dimensional MTG device 500 is adjacent to the Barrier Material 100.

When multiple like magnetic poles are placed or generated in one mass for the purpose of creating a controlled "bulge" or shape in the generated magnetic flux field, it is essential that the Magnetic Culminator be of adequate capacity or size. The size of the Magnetic Culminator 555 is determined by the mass and permeability of the intended Transparency volume region of the Barrier Material to be saturated or Magnetically Coupled. The Magnetic Culminator must never become saturated by the Magnetic Transparency Current.

In addition, the combined mass and permeability of Flux Circuit Core, including the cores, flanges, and Magnetic Culminator, if any, must be sufficiently larger than the mass and permeability of the target volume region of the Barrier Material such that the volume region of the Barrier Material will become saturated prior to the combined mass and permeability of the Magnetic Culminators, cores and flanges. If some part of the Flux Circuit Core is equivalently saturated by distance from the Barrier Material or by local saturation of the magnetic flux within that part of the Flux Circuit Core, the amount of Barrier Material that can be made Transparent is reduced.

If the separation distance is small with respect to the magnetic moment of the separated surfaces, the magnetic strength loss is proportional to 1/R, where "R" is the separation distance. However as R increases to be equal to or greater than the magnetic moment diameter then the flux intensity decreases at the rate of $1/R^3$. Therefore the flux field is rapidly dissipated.

Therefore, all magnets used to create the Transparency or Partial Transparency must be designed so that the total of the magnetic flux generated by the MTG remains within the Magnetic Culminator capacity. The value of R should not exceed the radius of the Magnetic Culminator. All magnetic flux paths must be complete, i.e., no path must have a large air or low permeability gap in it except in the target metal for enhanced results. It will be appreciated that the Magnetic Culminator will be the location of the greatest magnetic flux density. If a Magnetic Culminator is not utilized, the magnetic poles intended to created the Transparency in the volume area of the Barrier Material must be constructed of sufficient mass and permeability.

FIG. 20A and FIG. 20B show a MTG within a plurality of narrow tubes of EM Barrier Material such as a hydrocarbon production tubing and well casing. These figures also show that long extended coils arms 551 on the Magnetic Transparency Generator 500 are important since the complete length of the coils 551 contribute to the magnetic flux field generated between the North pole 504 and South pole 504. This is important since the length of the coils can greatly exceed the space 970 between the magnetic poles. It has been found that electromagnetic coils wrapped on a core for at least a distance of up to 100 diameters of the core diameter still contribute to the pole strength and amount of magnetic flux existing between the two magnetic poles. This assumes that the core material 552 upon which the coils 551 are wrapped is a highly permeable material. The higher the permeability, the greater the length of the arms 551 from magnetic poles and the stronger the magnets, which in turn means the more depth of the Barrier Materials 100 that can be saturated. Such a design is shown in FIG. 20A. This same design could be used inside other narrow apertures or other relative inaccessible spaces such as in offshore platforms, bridge decks and the like. Note also that the permeability of the Flux Circuit Core, consisting of the core 552, the magnetic poles 504 and 505, and the Magnetic Culminator 555 must never become saturated by the Transparency Current.

FIG. 20B shows a simple North South pole configuration consisting of a single North and South pole. The Sensing Signal Transmitter 300 would be wrapped around one of the poles, while the signal Receiver 580 would be wrapped around the other.

Figure 21A:
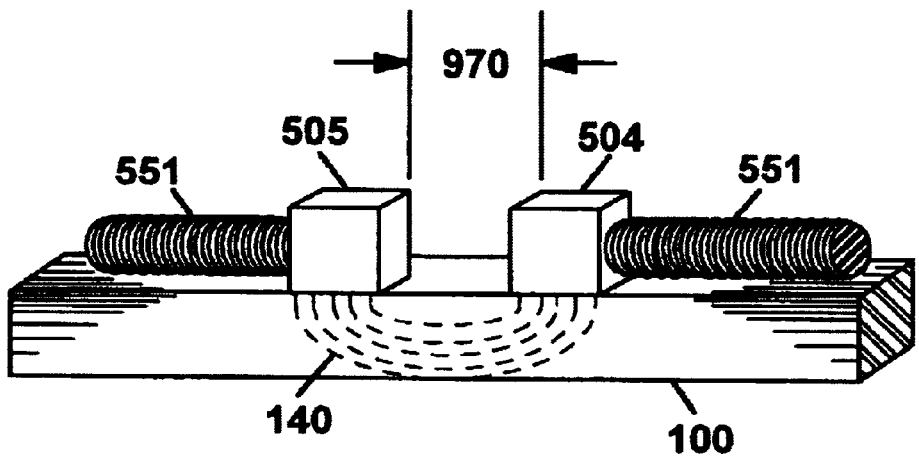
FIG. 21A illustrates magnetic flux lines from DC generated flux field.
Figure 21B:
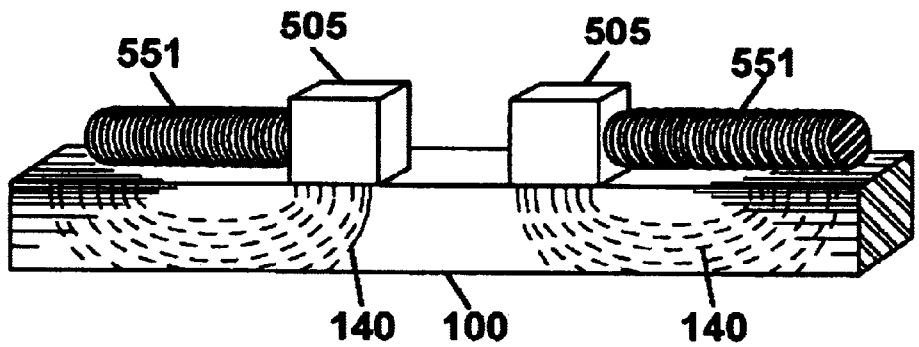
FIG. 21B illustrates magnetic flux lines from DC generated flux field where like magnetic poles are placed closely together.
Figure 21C:
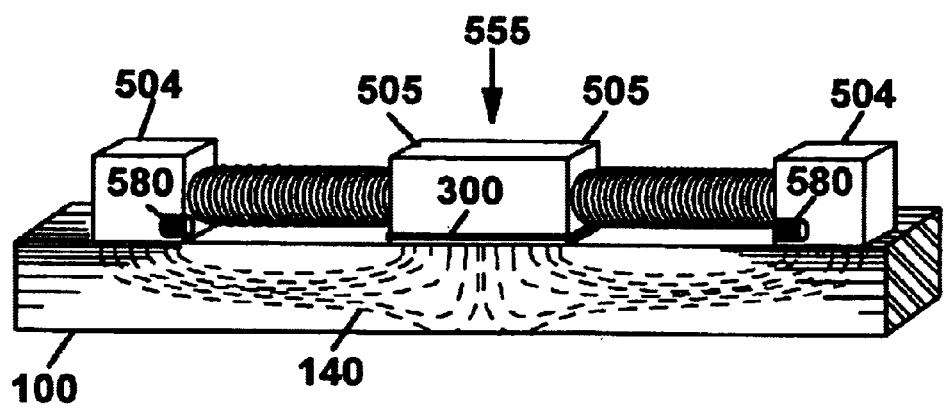
FIG. 21C illustrates Transparency Current flux lines in conjunction with the placement of transmitter and receiver coils.

FIGS. 21A, 21B and 21C show the geometry of Transparency current flux field lines penetrating into the EM Barrier Material 100. It is seen that in FIG. 21C that the Sensing Signal transmitter 300 is more centrally located in the magnetic flux field 140 of the Transparency volume region. In FIG. 21B, two opposing South poles are brought together or in close proximity between two North poles. The magnetic flux field fines emitted from the opposing South poles push the flux field out into the EM Barrier Material 100. However a large unsaturated volume region remains.

FIG. 21C shows the use of the Magnetic Culminator 555 containing two like poles 505. It has already been demonstrated that multiple like poles may be combined into a single Magnetic Culminator. Note that the magnetic flux lines permeate the thickness of the Barrier Material. This results in the location being well suited for placement of a Transmitter 300 or a Receiver (not shown).

It has been found that enhanced Magnetic Coupling, i.e., penetration of the EM Barrier Material 100, by the Transparency Current without saturation, is achieved utilizing this MTG configuration 500. In this case, Coupling allows more energy to be transferred to the Material 100 from the MTG 500.

Moreover, it is desired in these application designs to concentrate the magnetic flux energy of the Transparency Current into a minimal volume region. This requires closely positioning the North-South poles to each other as the exterior distance measurements allows. Therefore, if the material is "T" inches thick, to saturate all the way through the material the N,S spacing 970 must be at least "T" inches apart 960 in the simple configuration shown in FIG. 7A. However by "bucking" the poles, the same "T" inches depth of penetration may be achieved but with less than "T" inches separation between like poles. The benefit of minimizing the distances between the poles is that less energy, i.e., amp turns, are required for partial or full saturation of the subtended Barrier Material. If very long distances are to be measured outside and away from the Barrier Material, then it is advantageous if the Transmitter and Receiver are positioned in a bi-static array, i.e., each located within or in conjunction with separate Magnetic Transparency Generators.

Figure 22:
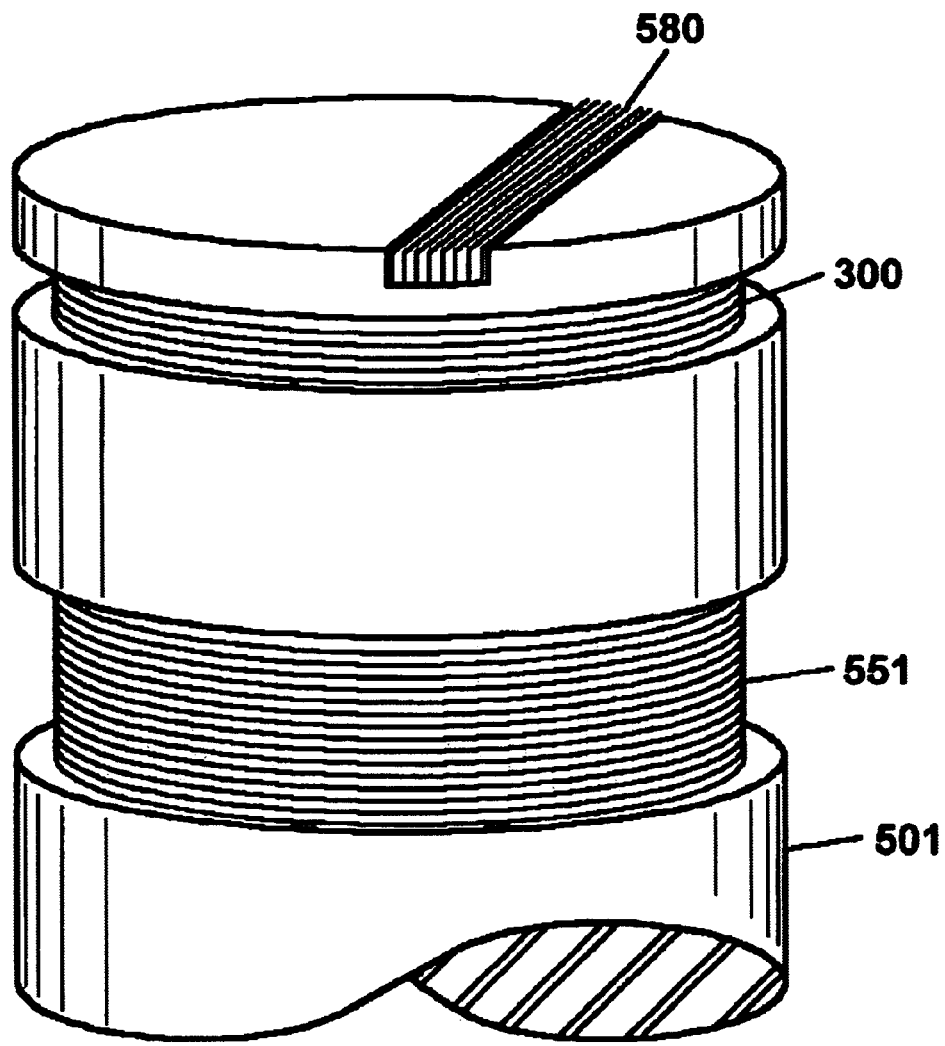
FIG. 22 illustrates a Flux Circuit Core by a DC current, around which a transmitter is wrapped, and flux lensing occurs at the surface penetrating length of the Core.

In FIG. 22 illustrates an embodiment of the invention wherein the Transparency Current 551 and the Transmitter Coil 300 are separately wrapped around the same Flux Circuit Core 501. The Flux Circuit Core is a simple cylindrical shape with both the Transparency Current coil and the Transmitter Coil wrapped in parallel around the axis of the cylinder 515. Since the Transparency Coil 552 and Transmitter Coil 300 have the same diameter, they will have the same magnetic moment (amp turns/meter). It will be appreciated that if the Transparency Current can not be allowed to saturate the Flux Circuit Core, the Oscillating Transmitter Current will generate eddy currents in the FCC. Further it will be appreciated by persons skilled in the art that the greatest saturation will occur along the circumference of the FCC. In that he manner the permeability of the near saturated or partially saturated FCC will lowest at the edge. Since the permeability of the Barrier Material will approach the permeability of air, the angle will increase from the perpendicular. It will be further appreciated that this configuration has created or utilized Magnetic Lensing capacity within the Magnetic Transparency Generator. FIG. 22 also illustrates the placement of a Receiver Coil 580 nulled to the Transmitter Coil 300.

3. Possible Temporal Variations in Opening and Closing the Magnetic Transparency These are the following considerations for the temporal variation of the saturation of the Barrier Material volume region in front of a Transmitter or Receiver.

1. Can use the material as an under-damping device for transmitting pulses for a pseudo-noise radar or reservoir mapping.

2. Transfer function wave form can be made to change with respect to saturation.

3. Can use temporal pairing for directionality measurements as discussed above.

4. Rapid on and off pulsing of the Transparency Circuit magnets allows the Barrier Material to be a time gate for transmitting signals or receiving signals. In the transmitting, for example, an oscillating Transparency Current can be used as a transmitter. This means the total saturated area becomes a transmitting antenna or the frequency of the Transparency frequency is matched to the transmitter frequency. Each of these considerations are discussed.

(A) The Transmitter Current can be used as an under damping device. In FIG. 15, the result of the superposition of a high frequency Signal Current pulse 418 on the relatively constant Transparency Current 420 is shown, i.e., steady state DC or low frequency AC current. The shaded area shows the region where the Barrier Material, i.e., carbon steel, is coming out of saturation. This means the permeability is more than one and more of the Transparency Current is absorbed into the Barrier Material. This higher permeability acts as a powerful damping mechanism on the pulse. This is very useful in truncating a transmitted single or signal wave so that the Transmitter does not cause "ringing." This ringing or oscillation at the end of the Transmitter pulse can obliterate nearby readings.

(B) The Transparency Current may be manipulated in such a way that the Transparencies are open as a transfer function wave form filter. This means that the Barrier Material can be used to allow only a certain upper frequency of a transmitted spectral Sensing Signal into the Receiver. The receiver transparency may be set to damp out all frequency above a desired range of frequencies. In this way, the Barrier Material would transmit only the desired upper frequency limit to the Receiver when placed in a different location from the Transmitter. It will be appreciated that this can be used in many varied and more sophisticated applications than a simple low pass filter illustrated here. For a diode, the current needed to put a material into magnetic saturation is called saturation current. If another current pulse is superimposed on saturation current, the additive part of the pulse will be transmitted, but the negative part of the pulse will reduce the total current below the saturation current. This negative part of the pulse will be severely damped by the metal because it is no longer magnetically saturated. This may be used as a type of diode for positive pulses.

(C) Directional or spatial information can be obtained by having sections of a steel wall equipped with saturating coils. In this way directionality may be obtained by creating a Transparency in front of different Transmitters, different Receivers, or any combination of the two. FIG. 11A show one embodiment of this concept (D) Combining directionality with the ability to gate electronically the opening and closing of the Transparency is another possibility. This gating would also cause the Receiver Transparency to be off during a pulse from the Transmitter, then open after a delay that would correspond to more distant signals returning. This would be an important part of a pulsed radar system with the gating preventing or allowing, as desired, the near reflections to enter the Receiver. Since the gating delays can be changed, in reality different parts of the reservoir are being sampled. Because the wavelengths are so long, this gating could be the useful for long distance mapping of reservoirs.

4. Nulling Techniques to Eliminate Direct Signal Coupling: The direct coupling between the Transmitter and Receiver is strong enough to overwhelm a secondary signal due to induced eddy currents. Therefore, a nulling technique must be used to de-couple the Transmitter Receiver. There are three (3) ways to accomplish this nulling. These are as follows:

a. Geometric nulling of the Transmitter-Receiver by orientation.

b. Separation of Transmitter—Receiver by unsaturated metal.

c. Electronic simple nulling of a waveform 180 degrees phase difference and matching amplitude, or by digital means. Each of these is used singly or in combination in the devices used in magnetic transparency.

Figure 23:
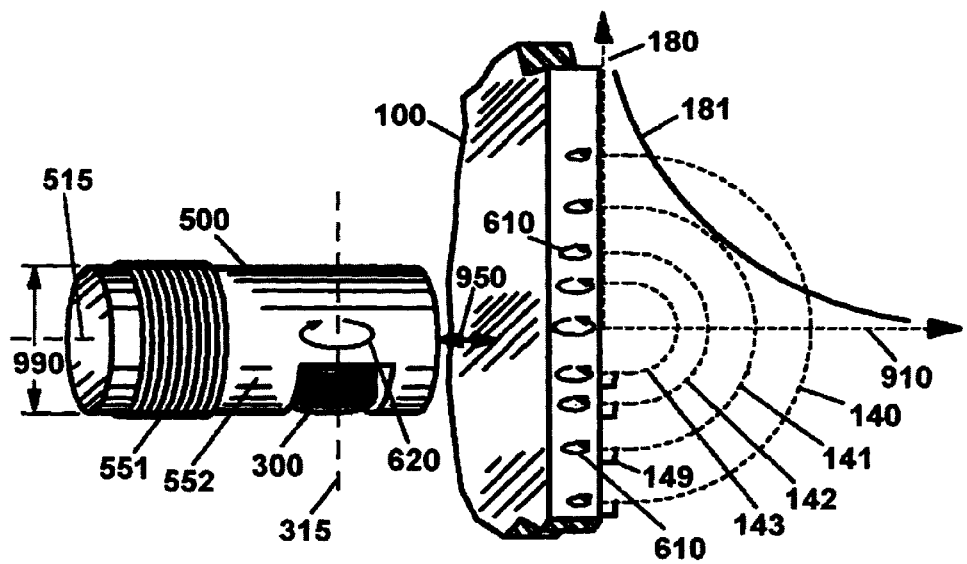
FIG. 23 illustrates another embodiment of the present invention.

As shown in FIG. 23 a central ferromagnetic core 552 is axially wrapped with insulated wire 551 to create a powerful low frequency or D.C. magnetic field along the longitudinal 515 axis of the core. A ferromagnetic core is used so that the magnetic flux lines do not disperse. "Low" frequency is defined by relationship to the frequency of the Transmitter Current wavelengths needed to make a measurement, e.g., if ten wavelengths are needed for the measurement, then the low frequency must be a least $\frac{1}{10}$ of the frequency of the Transmitter Current.

Also in FIG. 23, one embodiment of the invention shows a separate Transmitter 300 wrapped such that the eddy currents 620 generated in the core have an axis 315 perpendicular to the long axis 515 of the core 552. This core is then placed in some gap or distance 950 to the EM Barrier plate 100 or in contact to the EM Barrier plate 100. This EM Barrier can be made completely transparent for the Transmitter or, alternatively, an antenna or lens utilizing Partial Transparency. The optimum size of the gap 950 between the core 552 and the plate 100 is proportional to the magnetic moment of the transmitter/core diameter 990 and any lensing derived from the surface of the core 552 by the Transmitter Current being focused by the Transparency Current.

As previously mentioned, when a gap is present, e.g., insulation causing the space between the core 552 and EM Barrier plate 100, the wrapping of the Transmitter 300 on the core 552 utilizes this gap to create the Magnetic Lensing affect at the surface of the core, analogous to the lensing created at the EM Barrier surface. This Magnetic Lensing counteracts the decrease the Transmitter flux field with distance in an inverse cube rate at further gap distance away between the core interface to the metal plate. This is illustrated by the relationship of magnetic flux intensity decreasing to zero as the inverse cubed of the distance (D) 910 away from the surface, i.e., Intensity Plot=$1/D^3$. It will be appreciated that in the preferred embodiment of the invention, a ferromagnetic material is used for the Magnetic Lensing component.

There is less Lensing in the gap 950 and on the Barrier plate 100 due to the low frequency Transparency Coils.

However, the eddy current generated by the low frequency Transparency Current will also induce their own flux lines in the EM Barrier. The Transmitter 300 induced eddy currents 610 in the EM Barrier 100 are shown in FIG. 23. The resulting magnetic flux lines 140, 141, 142 and 143 generated from these electrical eddy currents inside the EM Barrier are shown in FIG. 23 intersecting the Barrier surface perpendicularly 149.

Figure 24:
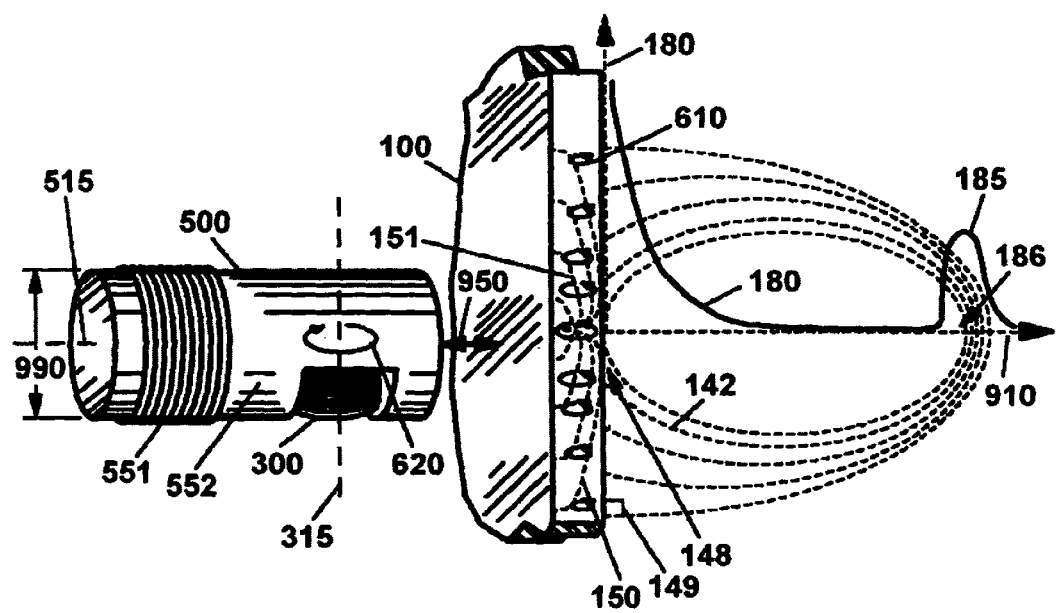
FIG. 24 illustrates the embodiment of the invention of FIG. 23 with the Transparency Current activated. The Figure also shows the intensity spike of transmitted Sensing Signal.

FIG. 24 depicts the change caused by the activation of the Transparency Magnet 551. In this embodiment, as shown in FIG. 23 and FIG. 24, the Transmitter 300 is a separate coil from the Transparency magnet 551. In another embodiment, it is possible to have the Transmitter Signal be superimposed electronically on the coupling Transparency current. There are separate advantages to each approach. It is preferred to utilize the Transmitter coupling magnet-separated embodiment. Both embodiments, however, are claimed as part of the subject invention of this application. It is also assumed that the Transparency magnet current is either D.C. or has frequency much less than the Transmitter frequency. The magnetic flux field lines 150 of this constant or low frequency magnetic Transparency Current are shown within the Barrier 100. This magnetic field lowers the permeability of the Barrier Material. The region of greatest influence of the magnetic field of the Transparency Coil core 552 is shown nearest the surface of the Barrier 100 and decreasing into the Barrier. As the permeability of the EM Barrier plate is reduced, the Transmitter flux lines begin to change their surface angle of impingement away from the perpendicular. It can be readily appreciated that the impingement angle 148 at the surface will be the limited to the flux angle that would exist if the Barrier was not present. This limit is approached as the permeability of the Barrier approaches unity with the permeability of the matter or media in the gap or space, e.g., air, adjacent to the EM Barrier. This changed impingement angle is shown in FIG. 24 near the region of the core's greatest influence in having reduced the permeability on the EM Barrier plate. Further away radially from the core, the magnetic flux lines again impinge perpendicularly to the plate surface 149.

Also shown in FIG. 24 is a plot 180 of the resulting flux intensity variation along the centerline 910. This shows an intensity spike 185 due to the concentration of the field at some fixed distance away from the plate surface. This flux field concentration is the same effect as would be obtained from an optical "lens" and is termed "Magnetic Lens" effect. The distance away from the EM Barrier plate at which these flux lines are concentrated is called the "Magnetic Focal Length." The place these flux lines are focused is called the "Magnetic Focal Point" 186. This Focal Point may be moved toward or away from the Barrier Material 100 by reducing or increasing the magnetic moment of the Transmitter and the Transparency Coil or the geometry of the magnetic fields in the metal plate.

Figure 25A:
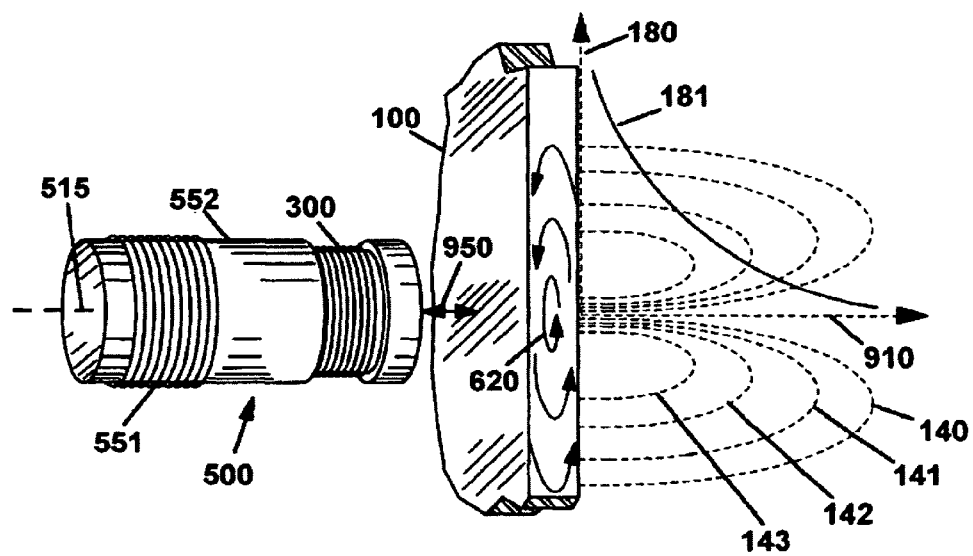
FIG. 25A illustrates the Transmitter rotated to be parallel to the metal plate. An intensity plot is also show for the illustrated configuration.

In FIG. 25A, the Transmitter Coil 300 is rotated to be parallel to the EM Barrier 100. The Transmitter induced eddy currents 620 generate the magnetic flux field having a geometry illustrated by field lines 140–143. Note the density of the magnetic flux field lines along line 910 as the flux field emerges from the partially saturated EM Barrier plate 100. Supplemented on the FIG. 25A is the plot 181 of the decrease in magnetic field intensity 180 as the distance from the surface 910 increases. The magnetic flux field intensity 180 decreases to zero along the plotted line 181. This illustrates that the intensity decreases in relation to the distance (D) 910 away from the surface, i.e., Intensity Plot 32 $1/D^3$.

Figure 25B:
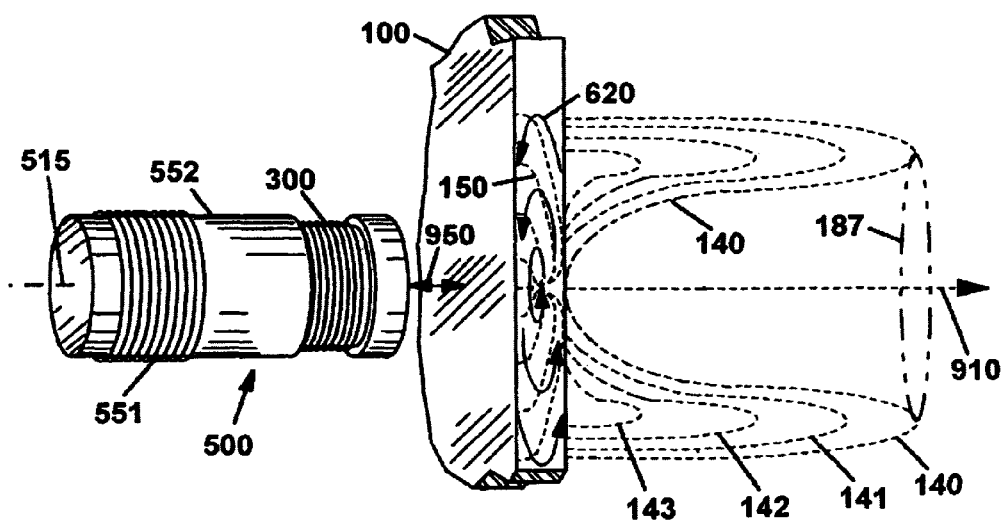
FIG. 25B illustrates the Sensing Current of the Transmitter when the Transparency Current is activated.

FIG. 25B shows the Transmitter induced magnetic flux field 140, 141, 142 and 143 when the MTG 500 is turned on. There is a concentration of the flux lines off the centerline 910 and Magnetic Lensing occurs in a different geometry from FIG. 24. The shape of the Transmitter induced magnetic flux field has changed. The focused flux fields create a "Focal Circle" 187 or "Focal Plane" instead of the focal point 186 geometry illustrated in FIG. 24.

Figure 31:
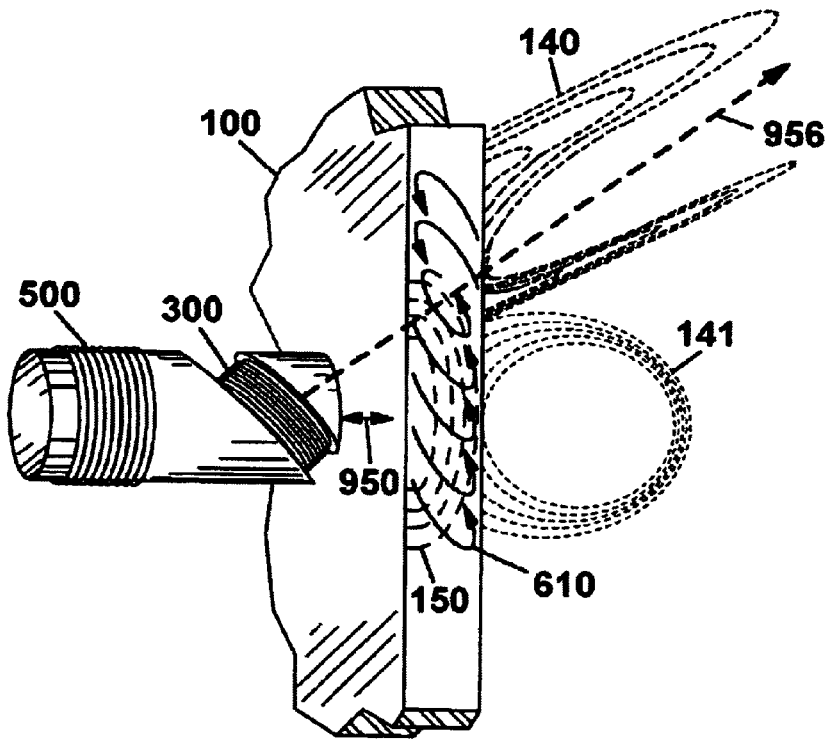
FIG. 31 illustrates another embodiment of the present invention wherein the Transmitter is placed at an angle to the EM Barrier.

There are advantages to winding the Transmitter coils 300 in this manner with respect to the EM Barrier plate 100. The main advantage is that all elements of the Transmitter coils can be made equidistant from the Barrier plate 100, therefore inducing an eddy current uniformly parallel or perpendicular to the surface of the EM Barrier plate and inducing a symmetrical magnetic flux field. If non-uniform eddy currents were desired, then it would be possible to rotate the axis of the Transmitter coil 300 to be some angle between perpendicular (as in FIGS. 23 and 24) or parallel (as in FIGS. 25A and 25B) to the metal plate. (This geometry is illustrated in FIG. 31.)

It will be appreciated that there is an eddy current generated in the core 501 and opposing the Transmitter Current. As the Transmitter coil 300 is moved axially along the core 501 and away from the end of the cylindrical core, more of the energy of the Transmitter is consumed by this opposing eddy current. Note that this decrease of Transmitter energy is experienced in spite of the gap 950 between the core 501 and the Barrier plate 100 remaining constant.

Using this Magnetic Lensing technique has allowed the Transmitter power to be minimized yet allowing detection of Objects at distances not possible without the consumption of much greater power and increased size of the Magnetic Transparency Generator subject of this invention.

Figure 26A:
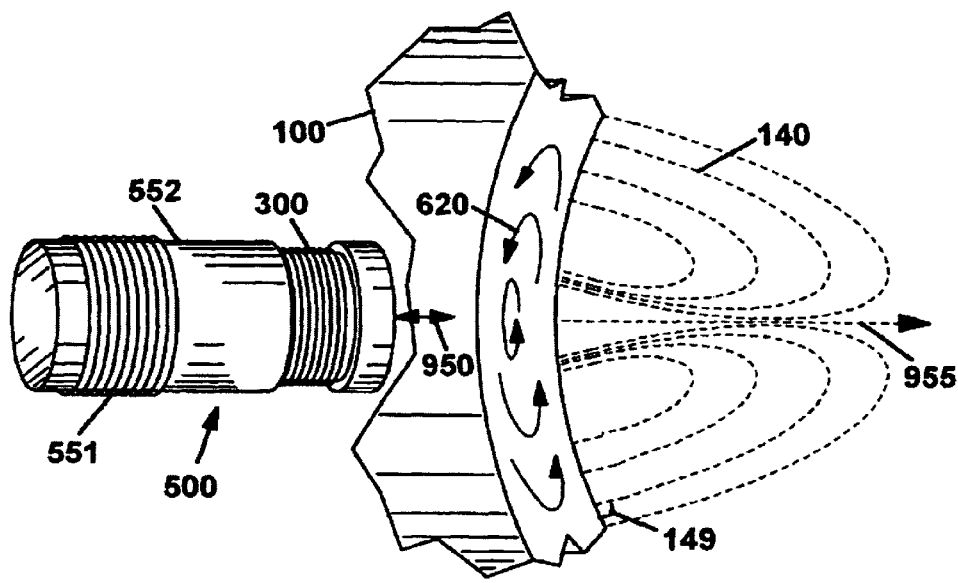
FIG. 26A illustrates the same embodiment of the invention but with the Transparency Current powered "off."
Figure 26B:
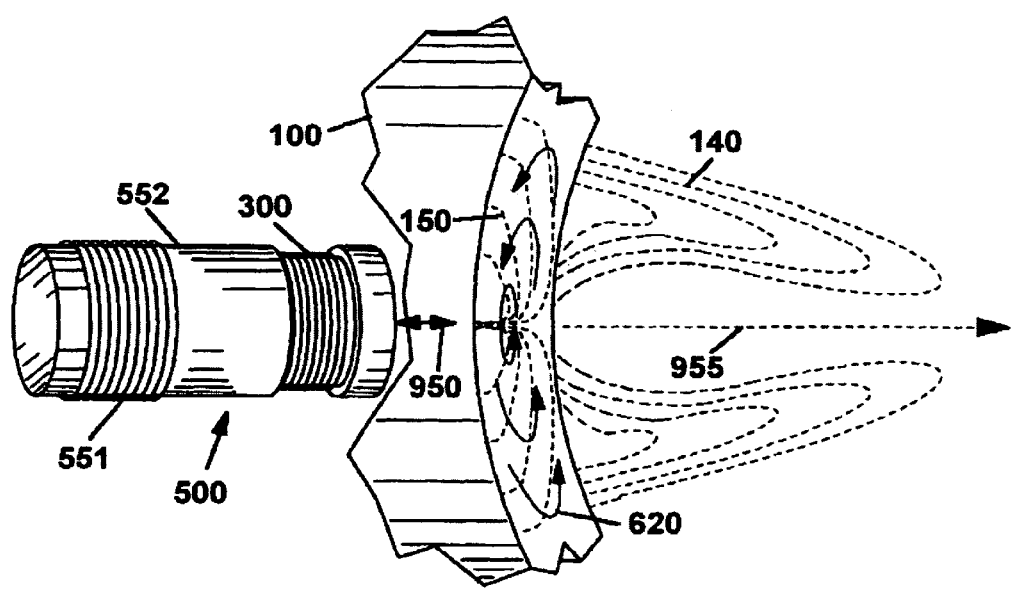
FIG. 26B illustrates another embodiment of the invention utilizing a curved metal plate with the Transparency Current powered "on."

FIG. 26A and FIG. 26B, illustrate another embodiment of the invention with a curved EM Barrier 100. It is preferred that the EM Barrier be a ferromagnetic material. The Transparency Coil 551 and the Transmitter Coil 300 are wrapped around the Core 552. The Receiver is not shown. Due to the EM Barrier 100 being only partially saturated, the induced magnetic flux field lines 140–143 emerge perpendicular to the EM Barrier surface 149. As result of the geometry of the EM Barrier curvature, this angle of emergence of the field lines helps concentrate the flux field. Note that the magnetic flux field lines 140–143 are perpendicular to the surface 149 even in the regions far from the metallic transparency effects. This helps concentrate the flux field since even these flux lines are contributing to the field strength at the focal point or focal plane (depending upon the orientation of the Transmitter coils to the EM Barrier plate). This embodiment of fixed curvature for the metallic plate antenna obviously predetermines the focal distance. For many applications, this embodiment would be ideal. Also, by concentrating these flux field lines through the curved Barrier plate 100, now acting as a Magnetic Antenna, the decrease in flux field density with respect to an increase in distance is mitigated. It will be appreciated that known techniques for creating flexible ferromagnetic shapes of parabolic or similar geometry may be used to allow adjustment of the magnetic focal distance.

Figure 27:
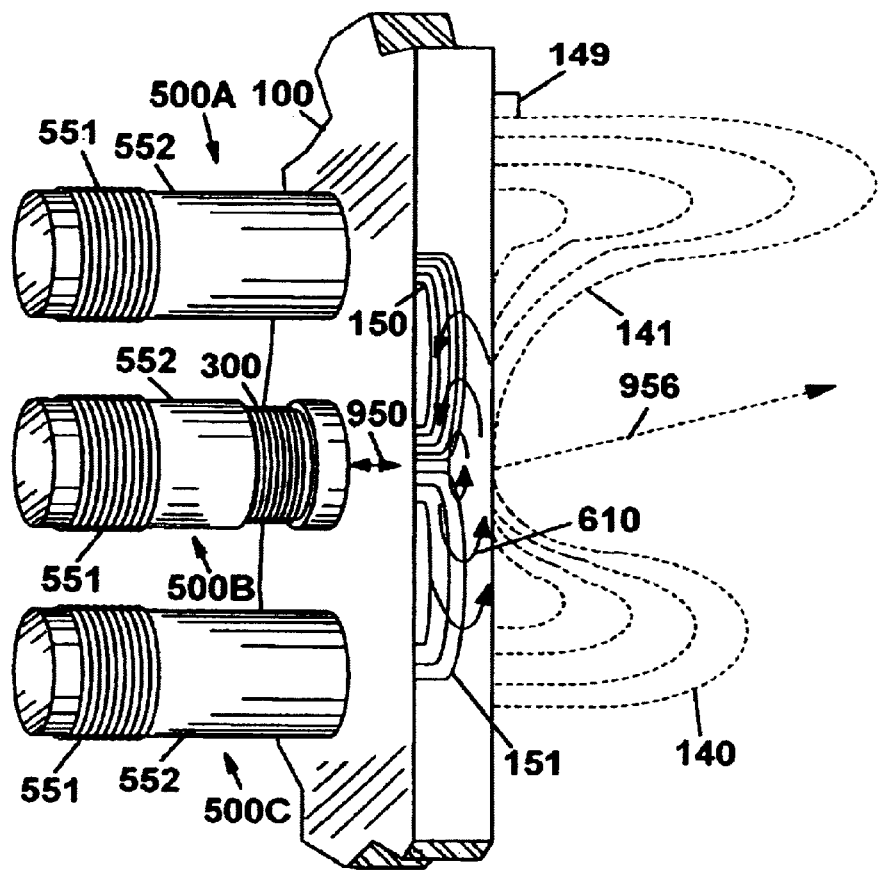
FIG. 27 illustrates another embodiment of the present invention where multiple magnets are utilized and the magnets are of unequal strength.

FIG. 27 shows beam directivity and steering capabilities by an inter-play of a plurality of MTG's, e.g., 500A, 500B and 500C and one Transmitter 300. In this Figure, MTG 500A and 500B are creating the maximum permeability reduction within the Barrier 100 proximate to Transmitter 300 and MTG 500A This creates the maximum bending of the flux lines 140–143 induced by Transmitter 300 towards MTG 500A. There is a maximum beam steering available by this single Transmitter technique.

Figure 28:
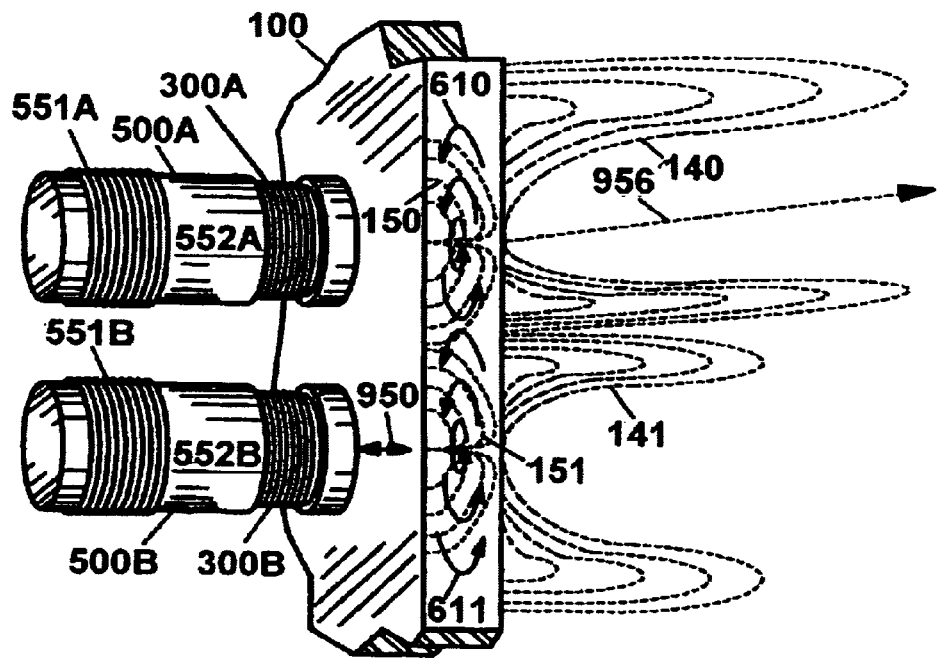
FIG. 28 illustrates another embodiment of the present invention wherein two Transparency magnets and two Transmitters of unequal strength are utilized.

FIG. 28 shows two Transmitters, 300A and 300B with bucked Transparency magnets 551A and 551B. The Transmitters are both wound with their coils parallel to the EM Barrier plate 100. To deflect the Transmitting Current 150 and 151 from 300A to the top, Transmitter 300B should be increased in strength (at the same frequency) and Transparency Current of 500B must be increased over Transparency Current of 500A.

Figure 29:
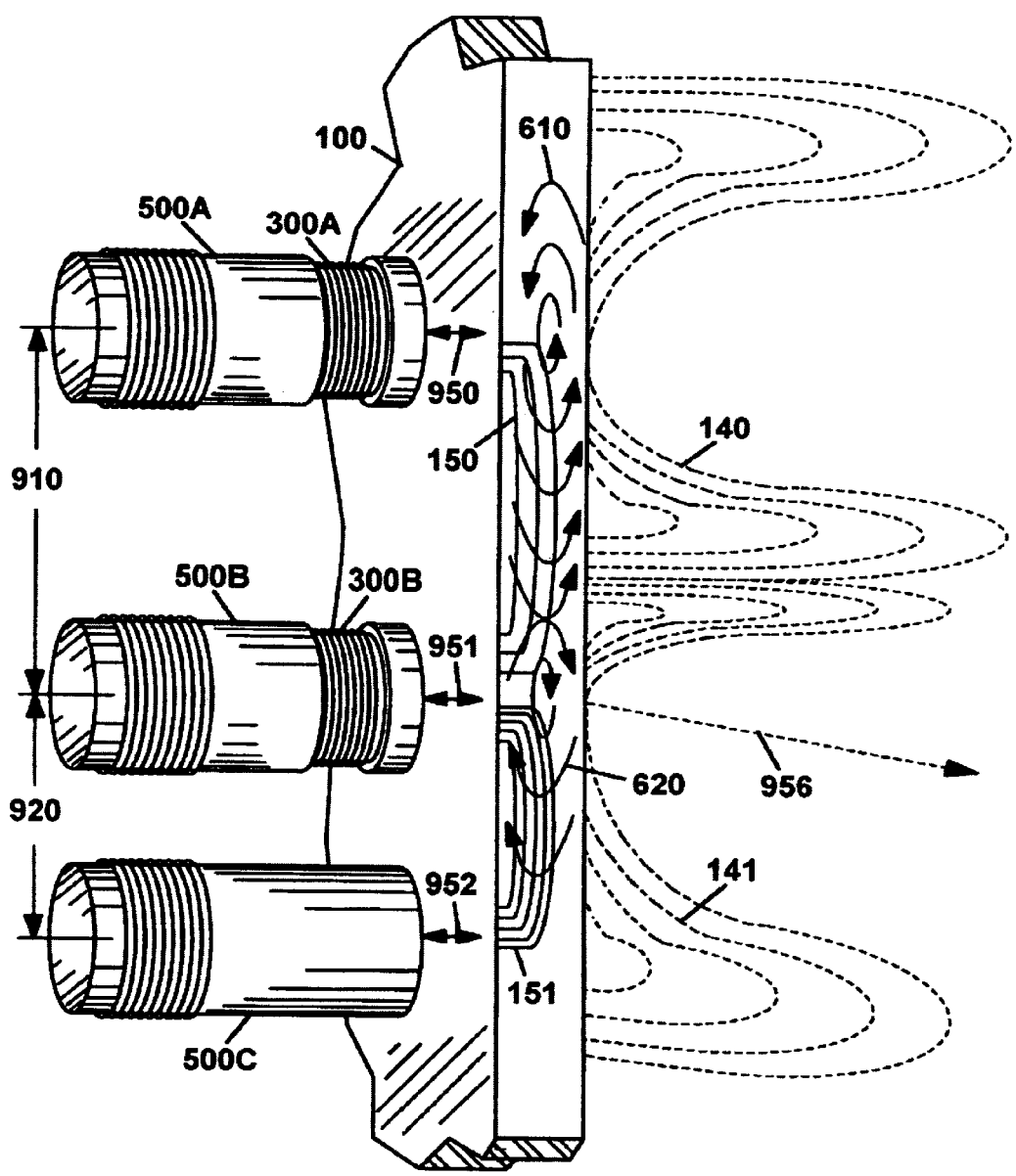
FIG. 29 illustrates another embodiment of the invention utilizing plurality of Transparency magnets of unequal strength and plurality of Transmitters also of unequal strength.

In FIG. 29, another Transparency magnet 500C is added to increase the current to the distance $D_{2,3}$. 910. This will bend the flux field 140–143 downward while Transmitter 300A is made much more powerful than Transmitter 300B to push the flux field down.

Figure 30:
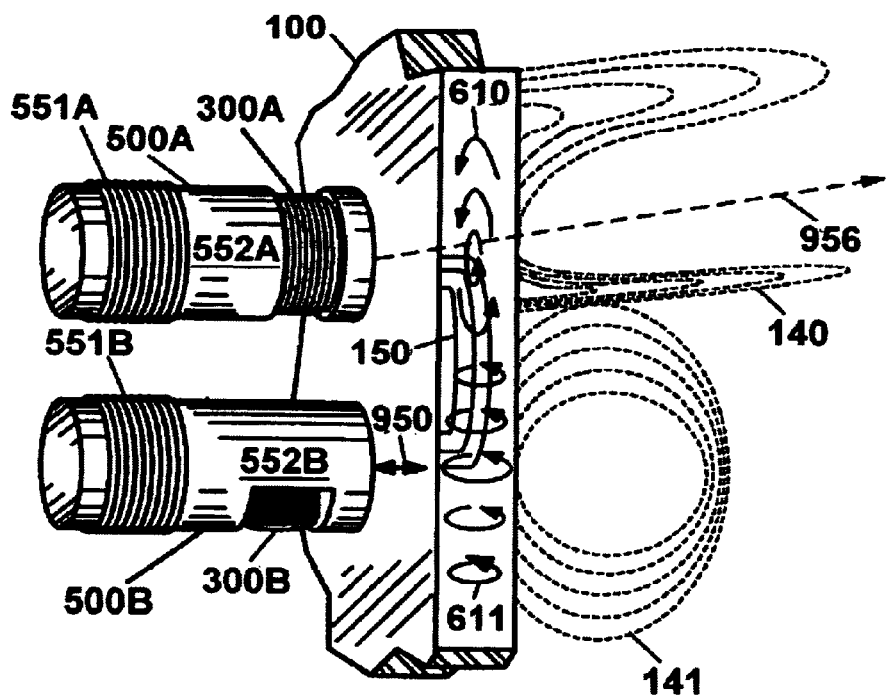
FIG. 30 illustrates another embodiment of the present invention.

In FIG. 30, another embodiment of beam movement is shown. This embodiment utilizes the Transmitters 300A and 300B having equal diameters but oriented at 90° to the other. Again, it is possible to use combinations of Transmitters and MTG's 500A and 500B having unequal saturation strengths to bend the flux field.

FIG. 31 shows the Transmitter 300 at an oblique angle to the metal plate 100. It is also oblique to the Transparency Coil 551 and Transparency Core 552. The metal plate, constituting an EM Barrier, is not fully saturated and the oscillating magnetic flux field of the Transmitter 300 induces eddy currents 610. These eddy currents are also at an oblique angle to the surface of the plate 100. Further, the eddy currents 610 induce a corresponding Magnetic Flux Field radiating out of the Barrier Plate. It should be noted that the field lines do not extend out of the Barrier plate toward the MTG but rather field lines stay in close proximity of the Barrier surface.

Figure 32A:
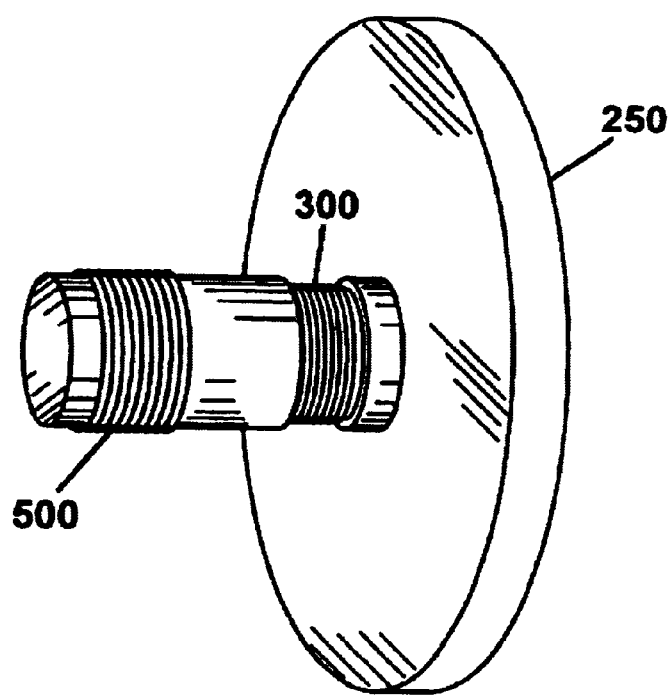
FIG. 32A illustrates an apparatus for a single beam with lensing.
Figure 32B:
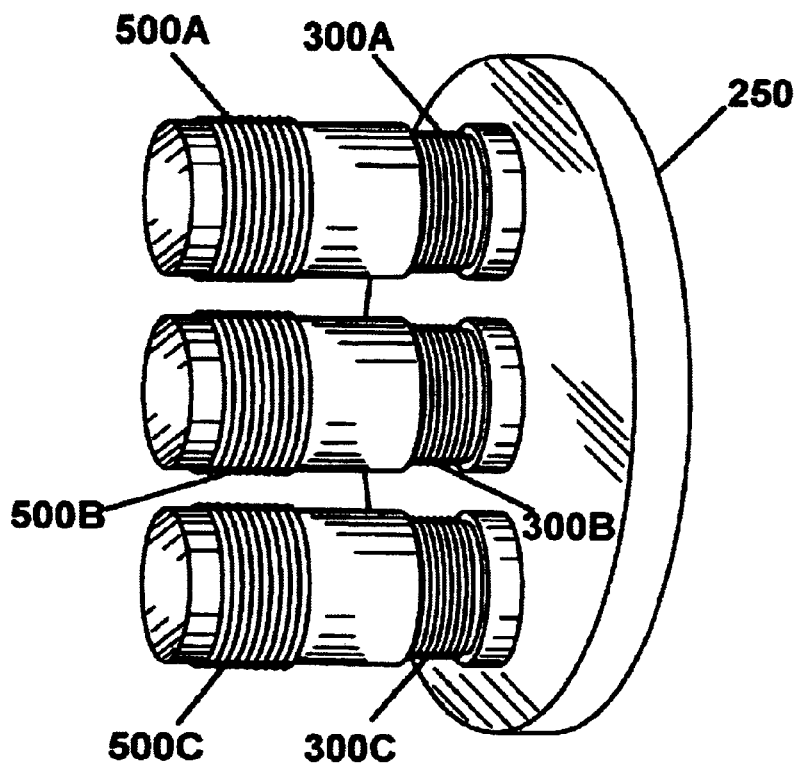
FIG. 32B illustrates beam interference with lensing.

It is obvious that a variety of combinations of permeability changes, Transmitter placements in 2D or 3D can be used with straight or curved metallic surfaces to create a large variety of beam forming devices. FIGS. 32A, 32B and 32C shows another embodiment of having directional flux fields through a transparent region in the Barrier Material. Directionality may be accomplished with orientation of the Transmitter or by beam forming using multiple Transmitter coils.

What is claimed is:

1. A method for transmitting electromagnetic waves from an electrically conductive and magnetically permeable material comprising the steps of:
   a) engaging a first side of an electrically conductive and magnetically permeable material with electromagnetic energy to variably reduce the permeability of the material through and proximate to a second side of the material;
   b) emitting an oscillating electromagnetic wave from the second side of the material having varying magnetic permeability such that some portion of the energy is emitted at an angle other than orthogonal to the surface of the second side;
   c) using the non orthogonal angle of emission from the second surface to modify the flux density of the magnetic component of the electromagnetic wave; and
   d) causing the modified oscillating electromagnetic wave to be available for reception by a receiver or engaging with an electrical conductive object.

2. The method of claim 1 further comprising modifying the magnetic flux density in a direction away from the second side of the material wherein the direction is azimuthal, radial or longitudinal.

3. The method of claim 1 wherein the density of the flux emitted from the surface of the second side increases at a distance from the surface.

4. The method of claim 1 wherein the surface of the second side of the material is substantially parallel to the surface of the first side.

5. The method of claim 4 wherein the relationship of at least a portion of the second surface to the first surface of the material is one of a group comprising planar-convex, planar-concave, planar-planar, convex-concave, convex-convex, convex-planar, concave-convex, and concave-planar.

6. The method of claim 1 wherein the oscillating electromagnetic wave emitted from the second side of the material is created by steps comprised of:
   a) engaging a first side of the electrically conductive and magnetically permeable material with a first electromagnetic wave transmitted from a first transmitter located proximate to the first side of the material;
   b) causing the material to become at least partially saturated with the magnetic flux of the first electromagnetic wave;
   c) engaging at least a portion of the partially saturated first side of the material with a second electromagnetic wave oscillating at a frequency higher than the first electromagnetic wave and transmitted from a location proximate to the first transmitter; and
   d) inducing eddy currents within the material that emit the oscillating electromagnetic wave from the second side of the material.

7. The method of claim 1 further comprising the induction of eddy currents within the material proximate to the surface of the second side of the material.

8. The method of claim 1 further comprising:
   a) inducing eddy currents within electrically conductive objects engaged by the electromagnetic wave emitted from the second side of the material; and
   b) causing a resulting electromagnetic wave to be emitted from the object that is available for reception by the receiver.

9. The method of claim 1 further comprising locating the receiver proximate to a first side of the material.

10. The method of claim 1 further comprising nulling at least one receiver to a transmitter.

11. An apparatus for transmitting an electromagnetic wave, having modified magnetic flux density, from electrically conductive and magnetically permeable material comprising the steps of:
    a) a first transmitter located proximate to and electrically isolated from the first side of an electrically conductive and magnetically permeable material for engaging the material with a first electromagnetic wave;
    b) a second transmitter at a location proximate to the first transmitter and electrically isolated from the material for engaging the material with an electromagnetic wave oscillating at a frequency higher than the first electromagnetic wave and generating eddy currents within the material that emit electromagnetic waves with an angle other than orthogonal from the surface of the second side of the material; and
    c) a receiver proximate to and electrically isolated from the first side of the material the material for detecting oscillating magnetic waves.

12. The apparatus of claim 11 further comprising at least two second transmitter coils wound in opposite directions to the other.

13. The apparatus of claim 11 further comprising at least two second transmitter coils having different magnetic moments.

14. The apparatus of claim 11 further comprising at least two second transmitter coils of unequal current amplitude.

15. The apparatus of claim 11 further comprising at least two transmitter coils of unequal number of turns of electrically conductive wire.

16. The apparatus of claim 11 further comprising a component of electrically conductive and magnetically per meable material wherein the relationship of at least a portion of the second side to the surface of the first side is of a group comprising planar-convex, planar-concave, planar-planar, convex-concave, convex-convex, convex-planar, concave-convex, and concave-planar.

17. The apparatus of claim 11 further comprising a magnetically permeable and electrically conductive core in conjunction with at least one transmitter.

18. The apparatus of claim 11 further comprising a plurality of magnetically permeable and electrically conductive cores in conjunction with at least one transmitter.

19. The apparatus of claim 11 wherein less than 20 watts of power is required for operation.

* * * * *